United States Patent
Guo

(10) Patent No.: US 12,160,825 B2
(45) Date of Patent: Dec. 3, 2024

(54) CROSS-NETWORK WAKE-UP METHOD AND RELATED DEVICE

(71) Applicant: Huawei Cloud Computing Technologies Co., Ltd., Guizhou (CN)

(72) Inventor: Hongge Guo, Shenzhen (CN)

(73) Assignee: Huawei Cloud Computing Technologies Co., Ltd., Guizhou (CN)

(*) Notice: Subject to any disclaimer, the term of this patent is extended or adjusted under 35 U.S.C. 154(b) by 298 days.

(21) Appl. No.: 17/683,863

(22) Filed: Mar. 1, 2022

(65) Prior Publication Data

US 2022/0182937 A1 Jun. 9, 2022

Related U.S. Application Data

(63) Continuation of application No. PCT/CN2020/111790, filed on Aug. 27, 2020.

(30) Foreign Application Priority Data

Sep. 2, 2019 (CN) .......................... 201910830885.0

(51) Int. Cl.
*H04W 52/02* (2009.01)
*H04L 61/256* (2022.01)
(Continued)

(52) U.S. Cl.
CPC ....... *H04W 52/0229* (2013.01); *H04L 61/256* (2013.01); *H04W 12/06* (2013.01);
(Continued)

(58) Field of Classification Search
CPC ... G06F 9/4416; H04L 12/12; H04L 12/2818; H04L 12/2825; H04L 61/2514;
(Continued)

(56) References Cited

U.S. PATENT DOCUMENTS

| | | |
|---|---|---|
| 2005/0223248 A1 | 10/2005 | Lim et al. |
| 2012/0233478 A1 | 9/2012 | Mucignat et al. |

(Continued)

FOREIGN PATENT DOCUMENTS

| | | |
|---|---|---|
| CN | 102761465 A | 10/2012 |
| CN | 103414575 A | 11/2013 |

(Continued)

OTHER PUBLICATIONS

Xu Qiuping; "Research and Implementation of Remote Wake-up", Journal of Engineering College of Armed Police Force, Feb. 2009, with an English abstract; 6 total pages.

*Primary Examiner* — Zhensheng Zhang
(74) *Attorney, Agent, or Firm* — Rimon PC

(57) ABSTRACT

A cross-network wake-up method and a related device are disclosed. In the method, an Internet of things (IoT) platform sends a wake-up instruction to an agent device that maintains a heartbeat connection to the IoT platform, and then sends, through the agent device, a wake-up message to a to-be-woken-up IoT device deployed on a same private network as the agent device. This resolves a technical problem that after a public-private network address mapping becomes invalid, a message from the IoT platform cannot reach a IoT device through a network address translation (NAT) device, and the IoT device cannot receive messages from the IoT platform.

13 Claims, 16 Drawing Sheets

(51) Int. Cl.
*H04W 12/06* (2021.01)
*H04W 76/10* (2018.01)
*G06F 9/4401* (2018.01)

(52) U.S. Cl.
CPC ....... *H04W 52/0212* (2013.01); *H04W 76/10* (2018.02); *G06F 9/4416* (2013.01)

(58) Field of Classification Search
CPC .............. H04L 61/2553; H04L 61/256; H04L 61/2578; H04L 63/029; H04L 63/083
See application file for complete search history.

(56) References Cited

U.S. PATENT DOCUMENTS

| | | | |
|---|---|---|---|
| 2012/0256009 A1* | 10/2012 | Mucignat | G06F 1/3296 |
| | | | 236/1 C |
| 2016/0056968 A1 | 2/2016 | Lee et al. | |
| 2017/0208032 A1 | 7/2017 | Cox | |
| 2018/0054799 A1 | 2/2018 | Starsinic et al. | |
| 2018/0063789 A1 | 3/2018 | Chen | |

FOREIGN PATENT DOCUMENTS

| | | | | |
|---|---|---|---|---|
| CN | 105357283 A | * | 2/2016 | ............. H04L 67/14 |
| CN | 107836104 A | | 3/2018 | |
| CN | 107968713 A | | 4/2018 | |
| CN | 108712485 A | | 10/2018 | |
| CN | 108886747 A | | 11/2018 | |
| CN | 109121188 A | | 1/2019 | |
| CN | 109474975 A | | 3/2019 | |
| EP | 1798890 A1 | | 6/2007 | |
| EP | 3258651 A1 | | 12/2017 | |
| TW | 202105959 A | * | 2/2021 | |

\* cited by examiner

| Title bar | | | |
|---|---|---|---|
| Function block | Internet of things device | Location | Operation |
| | Camera | Door | Video / Photo |
| | Smart lock | Door | Open the door |
| | Smart speaker | Living room | Play music |

FIG. 2

| Title bar | | | | |
|---|---|---|---|---|
| Function block | Internet of things device | Location | Status | Operation |
| | Camera | Door | Online | Video  Photo |
| | Smart lock | Door | Offline | Open the door |
| | Smart speaker | Living room | Offline | Play music |

FIG. 8

| Title bar | | | | |
|---|---|---|---|---|
| Function block | Internet of things device | Location | Status | Operation |
| | Camera | Door | Online | Video / Photo |
| | Smart lock | Door | Online | Open the door |
| | Smart speaker | Living room | Offline | Play music |

FIG. 9

| Title bar | | | | |
|---|---|---|---|---|
| Function block | Registered device | Device type parameter | Status | Operation |
| | Camera | 2 | Online | Video  Photo |
| | Smart lock | 2 | Offline | Open the door |
| | Agent device 1 | 1 | Online | Specify a target private network segment |

FIG. 12

CROSS-NETWORK WAKE-UP METHOD AND RELATED DEVICE

CROSS-REFERENCE TO RELATED APPLICATIONS

This application is a continuation of International Application No. PCT/CN2020/111790, filed on Aug. 27, 2020, which claims priority to Chinese Patent Application No. 201910830885.0, filed on Sep. 2, 2019, the disclosure of which is hereby incorporated by reference in its entirety.

TECHNICAL FIELD

This application generally relates to the field of Internet of things technologies, and in particular, to a cross-network wake-up method and a related device.

BACKGROUND

With the rise and implementation of the Internet of things (IoT) technology, the number of IoT devices being utilized continues to grow: The IoT technology combines various information sensing devices with the Internet to form an integrated network, to implement interconnection of people, machines, and things at anytime and anywhere.

Currently, IoT devices are generally connected to an IoT platform on the Internet through a network address translation (NAT) device. The network on which the IoT device is located is often a private network, and generally the IoT platform is deployed in a public network. The NAT device is used to connect the private network to the public network and perform network address translation. When actively communicating with the IoT platform, an IoT device uses the NAT device to perform network address translation and establish a public-private network address mapping between the IoT device and the IoT platform, and accesses the IoT platform by using a public Internet protocol (IP) address of the NAT device as an egress.

The IoT platform sends a message to the IoT device based on the public-private network address mapping on the NAT device. If the public-private network address mapping is invalid, the message from the IoT platform will not reach the IoT device through the NAT device. The public-private network address mapping on the NAT device generally has a two-minute life cycle or another limited life cycle. Therefore, when the IoT device is in a standby state or inactive for a long time, the IoT device does not actively send a heartbeat message to the IoT platform through the NAT device for more than 2 minutes, or another limited life cycle, the public-private network address mapping between the IoT device and the IoT platform on the NAT device becomes invalid. After the public-private network address mapping becomes invalid, messages from the IoT platform cannot reach the IoT device through the NAT device, and the IoT device cannot receive messages from the IoT platform.

SUMMARY

Embodiments of this application provide a cross-network wake-up method and a related device, to resolve the technical problem that a message from an Internet of things (IoT) platform cannot reach an IoT device through a NAT device, and the IoT device cannot receive the message when an IoT device stays in an standby state or inactive state for some period of time.

According to a first aspect, an embodiment of this application provides a cross-network wake-up method applied to an agent device. The agent device is a terminal device and deployed on a same private network under a same NAT device as N to-be-woken-up IoT devices. In addition, the agent device maintains, through the network address translation (NAT) device, a heartbeat connection to an IoT platform deployed on a public network, where N is an integer greater than or equal to 1. The cross-network wake-up method includes:

The agent device obtains a wake-up instruction sent by the IoT platform, where the wake-up instruction includes a private network address of the to-be-woken-up IoT device; and the agent device sends a wake-up message to the to-be-woken-up IoT device based on the wake-up instruction using the private network address, where the agent device sets a destination address of the wake-up message to the private network address, and then sends the wake-up message to the private network shared by the agent device and the to-be-woken-up IoT device, so that the wake-up message may reach the corresponding to-be-woken-up IoT device through the private network: the wake-up message is used to indicate to the to-be-woken-up IoT device to send a connection request message to the IoT platform; and the connection request message is used to indicate to the IoT platform to connect to the to-be-woken-up IoT device.

Therefore, in this method, the IoT platform sends the wake-up instruction to the agent device that maintains the heartbeat connection to the IoT platform, and then sends, through the agent device, the wake-up message to the to-be-woken-up IoT device that is deployed on the same private network as the agent device, so that the to-be-woken-up IoT device is woken up and reconnects to the IoT platform.

In a possible implementation of the first aspect, the wake-up instruction further includes an identity (ID) and a wake-up key of the to-be-woken-up IoT device. That the agent device sends a wake-up message to the to-be-woken-up IoT device based on the wake-up instruction using the private network address includes:

The agent device sends the wake-up message to the to-be-woken-up IoT device using the private network address, where the wake-up message includes the ID and the wake-up key of the to-be-woken-up IoT device, and the wake-up key is used for authentication before the to-be-woken-up IoT device establishes a connection to the IoT platform.

In a possible implementation of the first aspect, the private network address of the to-be-woken-up IoT device is in a target private network segment stored by the agent device, and the target private network segment includes a private network address served by the agent device.

In a possible implementation of the first aspect, before the agent device obtains the wake-up instruction sent by the IoT platform, the method further includes:

The agent device sends a first registration instruction to the IoT platform, where the first registration instruction includes an identifier, a registration type, and the private network address of the agent device, and the registration type is used to indicate a device type of the agent device; and the agent device receives the target private network segment from the IoT platform, where the target private network segment includes the private network address served by the agent device.

According to a second aspect, an embodiment of this application provides a cross-network wake-up method applied to an IoT platform. The IoT platform is deployed on a public network, and maintains a heartbeat connection to an agent device through a network address translation NAT device. The agent device and N to-be-woken-up IoT devices are deployed on a same private network, where N is an integer greater than or equal to 1. The cross-network wake-up method includes:

The IoT platform sends a wake-up instruction to the agent device, where the wake-up instruction includes a private network address of the to-be-woken-up IoT device, the wake-up instruction is used to instruct the agent device to send a wake-up message to the to-be-woken-up device, and the wake-up message is used to indicate to the to-be-woken-up device to send a connection message to the IoT platform:

the IoT platform obtains the connection request message, where the connection request message includes an identifier of the to-be-woken-up device; and the IoT platform connects to the to-be-woken-up device based on the connection request message.

Therefore, when the IoT platform needs to wake up the IoT device, the IoT platform may send the wake-up instruction to the agent device, and the agent device sends the wake-up message to the corresponding IoT device based on the wake-up instruction. After receiving the wake-up message, the IoT device actively connects to the IoT platform, to implement wake-up of the IoT device.

In a possible implementation of the second aspect, before the IoT platform sends the wake-up instruction to the agent device, the method further includes:

The IoT platform receives a first registration instruction of the agent device, where the first registration instruction includes an identifier, a registration type, and a private network address of the agent device, and the registration type is used to indicate a device type of the agent device:

the IoT platform determines a target private network segment of the agent device based on the private network address of the agent device, where the target private network segment includes one or more private network addresses served by the agent device;

the IoT platform stores the identifier of the agent device and the registration type; and the IoT platform sends the target private network segment to the agent device.

In a possible implementation of the second aspect, before the IoT platform sends the wake-up instruction to the agent device, the method further includes:

the IoT platform receives a second registration instruction of the to-be-woken-up IoT device, where the second registration instruction includes the identifier, a registration type, a private network address of the IoT device, and function information of the to-be-woken-up IoT device, the registration type is used to indicate a device type of the to-be-woken-up IoT device, and the function information includes wake-up support information; and the IoT platform stores the ID, the registration type, and the private network address of the to-be-woken-up IoT device.

In a possible implementation of the second aspect, before the IoT platform sends the wake-up instruction to the agent device, the method further includes:

The IoT platform generates the wake-up instruction that carries the ID and a wake-up key of the to-be-woken-up IoT device, where the ID and the wake-up key of the to-be-woken-up IoT device are used for authentication before the to-be-woken-up IoT device establishes a connection to the IoT platform.

In a possible implementation of the second aspect, before the IoT platform sends the wake-up instruction to the agent device, the method further includes:

If the IoT platform determines that a device status of the to-be-woken-up IoT device is offline, the IoT platform generates the wake-up instruction based on the identifier of the to-be-woken-up IoT device and the private network address that is of the to-be-woken-up IoT device and that is stored on the IoT platform.

According to a third aspect, an embodiment of this application provides a cross-network wake-up method, including:

A to-be-woken-up IoT device receives a wake-up message sent by an agent device, where the agent device maintains, through a network address translation NAT device, a heartbeat connection to an IoT platform deployed on a public network, and the agent device and the to-be-woken-up IoT device are deployed on a same private network; and the to-be-woken-up IoT device sends a connection request message to the IoT platform based on the wake-up message through the network address translation NAT device, where the connection request message is used to indicate to the IoT platform to connect to the to-be-woken-up IoT device.

In a possible implementation of the third aspect, before the to-be-woken-up IoT device sends the connection request message to the IoT platform based on the wake-up message through the network address translation NAT device, the method further includes:

The to-be-woken-up IoT device receives an ID and a wake-up key of the to-be-woken-up IoT device that are sent by the agent device; and if the ID and the wake-up key of the to-be-woken-up IoT device meet a preset condition, the to-be-woken-up IoT device sends the connection request message to the IoT platform based on the wake-up message through the network address translation NAT device.

According to a fourth aspect, an embodiment of this application provides a command forwarding method, applied to an agent device. The agent device is a terminal device and deployed on a same private network under a same NAT device as N IoT devices. In addition, the agent device maintains, through the network address translation NAT device, a heartbeat connection to an IoT platform deployed on a public network, where N is an integer greater than or equal to 1. The command forwarding method includes:

The agent device obtains a command forwarding instruction sent by the IoT platform, where the command forwarding instruction includes a private network address of the IoT device and an operation instruction, and the operation instruction is used to instruct the IoT device to perform a corresponding operation; and the agent device sends a command message to the IoT device based on the command forwarding instruction using the private network address, where the agent device sets a destination address of the command message to the private network address of the IoT device, and then sends the command message to the private network shared by the agent device and the IoT device, so that the command message can reach the corresponding IoT device through the private network; the command message includes the operation instruction; and the command message is used to indicate to the IoT device to execute the operation instruction.

In some embodiments of this application, the IoT device may support a wake-up mode or a command forwarding mode. The IoT platform may first determine, based on function information of the IoT device, whether the IoT device supports either or both of the wake-up mode and the command forwarding mode. When the IoT device supports the wake-up mode, the IoT platform, the agent device, and the IoT device may perform the cross-network wake-up method according to the first aspect, the second aspect, and the third aspect. When the IoT device supports the command forwarding mode, the IoT platform, the agent device, and the IoT device may perform the command forwarding method in the fourth aspect.

According to a fifth aspect, an embodiment of this application provides an agent device, including:
- an obtaining unit, configured to obtain a wake-up instruction sent by an IoT platform, where the wake-up instruction includes a private network address of a to-be-woken-up IoT device; the agent device maintains, through a network address translation (NAT) device, a heartbeat connection to the IoT platform deployed on a public network; and the agent device and N to-be-woken-up IoT devices are deployed on a same private network, where N is an integer greater than or equal to 1; and
- a sending unit, configured to send a wake-up message to the to-be-woken-up IoT device based on the wake-up instruction using the private network address, where the wake-up message is used to indicate to the to-be-woken-up IoT device to send a connection request message to the IoT platform, and the connection request message is used to indicate to the IoT platform to connect to the to-be-woken-up IoT device.

In a possible implementation of the fifth aspect, the sending unit is further configured to:
- send the wake-up message to the to-be-woken-up IoT device using the private network address, where the wake-up message includes an ID and a wake-up key of the to-be-woken-up IoT device, and the wake-up key is used for authentication before the to-be-woken-up IoT device establishes a connection to the IoT platform.

In another possible implementation of the fifth aspect, the private network address of the to-be-woken-up IoT device is in a target private network segment stored by the agent device, and the target private network segment includes one or more private network addresses served by the agent device.

In another possible implementation of the fifth aspect, the sending unit is further configured to:
- send a first registration instruction to the IoT platform, where the first registration instruction includes an identifier, a registration type, and the private network address of the agent device, and the registration type is used to indicate a device type of the agent device.

The obtaining unit is further configured to receive the target private network segment from the IoT platform, where the target private network segment includes one or more private network addresses served by the agent device.

According to a sixth aspect, an embodiment of this application provides an IoT platform, including:
- a sending unit, configured to send a wake-up instruction to an agent device, where the wake-up instruction includes a private network address of a to-be-woken-up IoT device: the agent device maintains, through a NAT device, a heartbeat connection to the IoT platform deployed on a public network: the agent device and N to-be-woken-up IoT devices are deployed on a same private network: the wake-up instruction is used to instruct the agent device to send a wake-up message to the to-be-woken-up device; and the wake-up message is used to indicate to the to-be-woken-up device to send a connection message to the IoT platform, where N is an integer greater than or equal to 1;
- an obtaining unit, configured to obtain the connection request message, where the connection request message includes an identifier of the to-be-woken-up device; and
- a processing unit, configured to connect to the to-be-woken-up device based on the connection request message.

In a possible implementation of the sixth aspect, the obtaining unit is further configured to receive a first registration instruction of the agent device, where the first registration instruction includes an identifier, a registration type, and a private network address of the agent device, and the registration type is used to indicate a device type of the agent device.

The processing unit is configured to determine a target private network segment of the agent device based on the private network address of the agent device, where the target private network segment includes the private network address served by the agent device.

The processing unit is further configured to store the identifier and the registration type of the agent device.

The sending unit is further configured to send the target private network segment to the agent device.

In another possible implementation of the sixth aspect, the obtaining unit is further configured to receive a second registration instruction of the to-be-woken-up IoT device, where the second registration instruction includes an identity (ID), a registration type, a private network address, and function information of the to-be-woken-up IoT device, the registration type is used to indicate a device type of the to-be-woken-up IoT device, and the function information includes wake-up support information.

The processing unit is further configured to store the ID, the registration type, the private network address, and the function information of the to-be-woken-up IoT device.

In another possible implementation of the sixth aspect, the processing unit is further configured to generate a wake-up instruction, where the wake-up instruction carries an ID and a wake-up key of the to-be-woken-up IoT device, and the ID and the wake-up key of the to-be-woken-up IoT device are used for authentication before the to-be-woken-up IoT device establishes a connection to the IoT platform.

In another possible implementation of the sixth aspect, the processing unit is further configured to: if the IoT platform determines that a device status of the to-be-woken-up IoT device is offline, generate, by the IoT platform, the wake-up instruction based on the ID of the to-be-woken-up IoT device and the private network address that is of the to-be-woken-up IoT device and that is stored on the IoT platform.

According to a seventh aspect, an embodiment of this application provides a to-be-woken-up IoT device, including:
- a receiving unit, configured to receive a wake-up message sent by an agent device, where the agent device maintains, through a NAT device, a heartbeat connection to an IoT platform deployed on a public network, and the agent device and the to-be-woken-up IoT device are deployed on a same private network; and
- a sending unit, configured to send a connection request message to the IoT platform based on the wake-up message through the NAT device, where the connection request message is used to indicate to the IoT platform to connect to the to-be-woken-up IoT device.

In a possible implementation of the seventh aspect, the receiving unit is further configured to receive an ID and a wake-up key of the to-be-woken-up IoT device that are sent by the agent device.

The sending unit is further configured to: if the ID and the wake-up key of the to-be-woken-up IoT device meet a preset condition, send, by the to-be-woken-up IoT device, the connection request message to the IoT platform based on the wake-up message through the network address translation NAT device.

According to an eighth aspect, an embodiment of this application provides an agent device, including:
one or more central processing units, a memory, an input/output interface, a wired or wireless network interface, and a power supply.

The memory is a transient storage memory or a persistent storage memory.

The central processing unit is configured to communicate with the memory, and execute, on the agent device, an instruction operation in the memory, to perform the method according to the first aspect or the fourth aspect.

According to a ninth aspect, an embodiment of this application provides an IoT platform server, including:
one or more central processing units, a memory, an input/output interface, a wired or wireless network interface, and a power supply.

The memory is a transient storage memory or a persistent storage memory.

The central processing unit is configured to communicate with the memory, and execute, on the IoT platform server, an instruction operation in the memory, to perform the method according to the second aspect.

According to a tenth aspect, an embodiment of this application provides a to-be-woken-up IoT device, including:
one or more central processing units, a memory, an input/output interface, a wired or wireless network interface, and a power supply.

The memory is a transient storage memory or a persistent storage memory.

The central processing unit is configured to communicate with the memory, and execute, on the to-be-woken-up IoT device, an instruction operation in the memory, to perform the method according to the third aspect.

According to an eleventh aspect, an embodiment of this application provides a transitory or non-transitory computer-readable storage medium, including instructions. When the instructions are run on a computer, the computer is enabled to perform a process of the method according to the first aspect, the second aspect, the third aspect, or the fourth aspect.

According to a twelfth aspect, an embodiment of this application provides a computer program product including instructions. When the computer program product runs on a computer, the computer is enabled to perform a process of the method according to the first aspect, the second aspect, the third aspect, or the fourth aspect.

It can be learned from the foregoing technical solutions that the embodiments of this application have the following advantages:

The embodiments of this application provide a cross-network wake-up method and a related device. In the method, an IoT platform sends a wake-up instruction to an agent device that maintains a heartbeat connection to the IoT platform, and then sends, through the agent device, a wake-up message to a to-be-woken-up IoT device that is deployed on a same private network as the agent device. In this way, the to-be-woken-up IoT device is woken up and connected to the IoT platform, so that the IoT platform deployed on a public network wakes up, in a cross-network manner, the to-be-woken-up IoT device deployed on the private network. This resolves a technical problem that after a public-private network address mapping becomes invalid, a message from the IoT platform cannot reach an IoT device through a NAT device, and the IoT device cannot receive the message.

BRIEF DESCRIPTION OF DRAWINGS

FIG. 2 is a schematic diagram of an interface on which a user sends instructions to a device after logging in to an IoT platform according to an embodiment of this application:

FIG. 8 is a schematic diagram of an interface before an IoT platform modifies a status of an IoT device according to an embodiment of this application:

FIG. 9 is a schematic diagram of an interface after an IoT platform modifies a status of an IoT device according to an embodiment of this application:

FIG. 12 is a schematic diagram of an interface on which an IoT platform displays registered devices according to an embodiment of this application:

DESCRIPTION OF EMBODIMENTS

Embodiments of this application provide a cross-network wake-up method and a related device, to resolve a technical problem that a message from an Internet of Things (IoT) platform cannot reach an Internet of things device through a network address translation (NAT) device, and the IoT device cannot receive the message.

IoT is utilized in various apparatuses and technologies such as various information sensors, radio frequency identification technologies, global positioning systems, infrared sensors, and laser scanners to collect, in real time, an object or process that is monitored, connected, or interacted. IoT may also be used to collect various required information, such as acoustic, optical, thermal, electrical, mechanical, chemical, biological, and location information, of the object or the process. Through various kinds of possible network access, ubiquitous connections between objects and between objects and people are implemented, and the objects and processes are intelligently perceived, identified, and managed. The IoT is an information carrier based on the Internet, conventional telecommunications networks, and the like, and enables all common physical objects that can be independently addressed to form an interconnected network.

Application of the IoT involves various fields. Application of the IoT in infrastructure fields, such as industry, agriculture, environment, transportation, logistics, and security; effectively promotes intelligent development of these fields, and makes limited resources more rationally utilized and allocated, thereby improving industrial efficiency and benefits. Application of the IoT in fields that are closely related to daily use, such as household, medical and health care, education, finance and service industry, and tourism, greatly improves the service scope, service mode, service quality; and the like, and may greatly improve people's quality of life. In the field of defense and military affairs, although application of the IoT is still in a research and exploration stage, impact of the application of the IoT cannot be underestimated. From equipment systems such as satellites, missiles, aircraft and submarines to individual combat equipment, embedding of the IoT technology effectively enhances military intelligence, informatization, and precision, greatly improves military combat effectiveness, and is a key to future military transformation.

The following describes the technical solutions in the embodiments of the present disclosure with reference to the accompanying drawings in the embodiments of the present disclosure. It is clear that the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
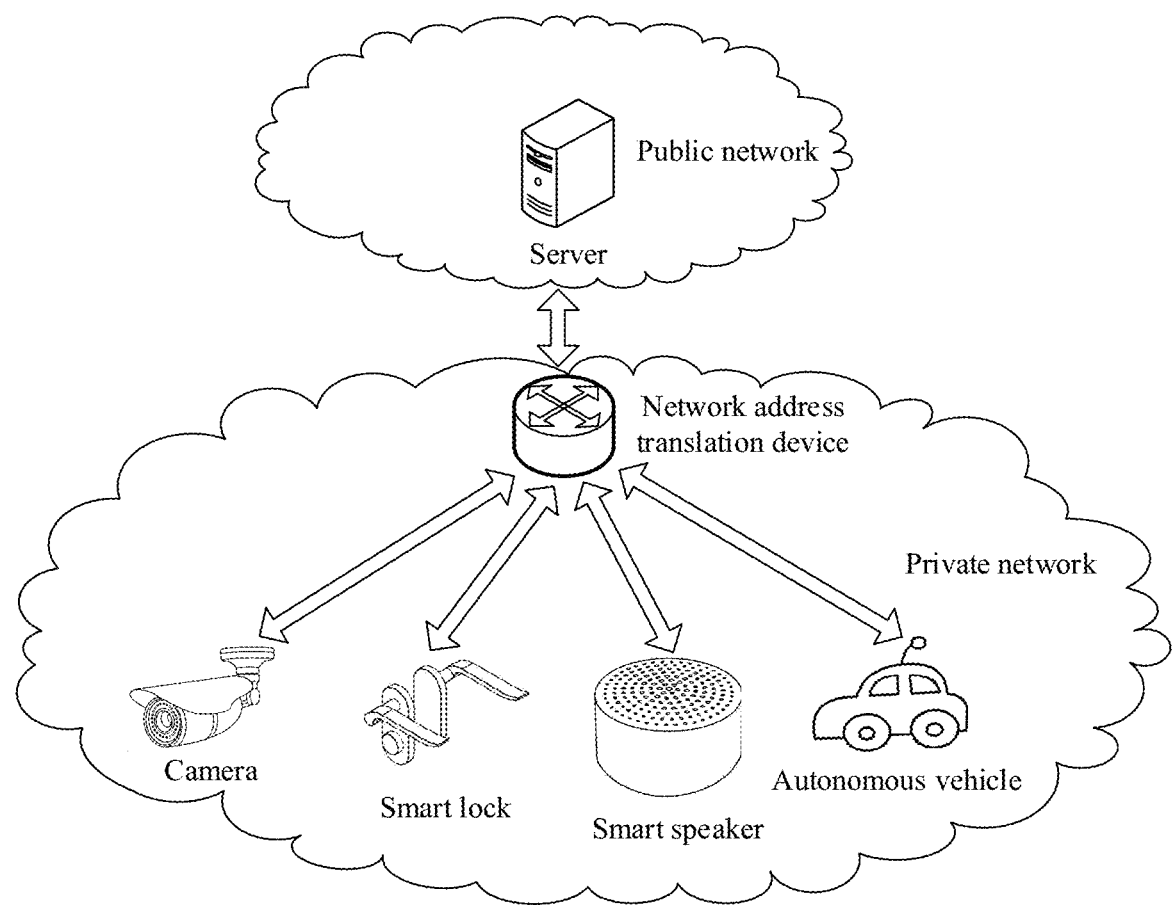
FIG. 1 is a schematic diagram of an Internet of Things (IoT) framework according to an embodiment of this application.

FIG. 1 is a schematic diagram of an IoT framework according to an embodiment of this application. It can be learned that a server is connected to various IoT devices through a network address translation (NAT) device. The server is provided with an IoT platform, and a user of the IoT platform sends, by using the IoT platform, an operation instruction to each IoT device connected to the IoT platform. The IoT platform may further automatically control an IoT device based on information about the IoT device. The IoT device may be used in the foregoing various fields, and may include but is not limited to a camera, a smart lock, a smart speaker, an autonomous vehicle, or the like. In some embodiments of this application, the IoT device may also be referred to as a to-be-woken-up IoT device. For ease of description, the term "IoT device" is used for description in some embodiments of this application.

The NAT device is connected to the server and the IoT devices. Network address translation, also known as network masking or Internet protocol (IP) address masking, is a technique that rewrites a source IP address or a destination IP address of an IP data packet when the data packet passes through a router or firewall. This technique is commonly used in a private network with a plurality of hosts accessing the Internet through only one public IP address. As shown in FIG. 1, a network on which the server is located is a public network, a network on which the IoT devices are located is a private network, a private IP address of the camera is 192.168.0.1, a private IP address of the smart lock is 192.168.0.2, a private IP address of the smart speaker is 192.168.0.3, and a private IP address of the autonomous vehicle is 192.168.0.4. After instructions of these IoT devices are sent to the NAT device, the NAT device translates source addresses of the instructions to a public IP address 219.152.168.222 of the NAT device and sends the instructions to the server. Before the server sends an instruction to the IoT device, the IoT device connects to the server through the NAT device and sends the private IP address of the IoT device to the server, and the server stores the private IP address. When the server needs to send an operation instruction to the IoT device, the IoT platform generates an instruction including a private IP address, and then sends the instruction to the NAT device through the server. The NAT device translates a target IP address of the instruction into the private IP address based on the private IP address and a public-private network address mapping in the instruction. Then, the NAT device forwards the instruction to an IoT device corresponding to the private IP address, so that the IoT device performs a corresponding operation in response to the instruction. For example, if the server needs to send an instruction to the smart lock, the server sends an instruction including the private IP address 192.168.0.2 to the NAT device. After receiving the instruction, the NAT device translates a destination address of the instruction into the private IP address 192.168.0.2, to send the instruction to the smart lock with the private IP address 192.168.0.2.

Table 1 is a mapping table of public-private network address mappings according to some embodiments of this application. It can be learned that there is a mapping relationship between the private IP address of the IoT device and a public IP address of the IoT platform. When receiving an instruction of the IoT device, an agent device may modify a source IP address of the instruction to the public IP address of the NAT device. The agent may then establish a public-private network address mapping between the private IP address of the IoT device and the public IP address of the IoT platform based on the public IP address of the IoT platform in the instruction. When receiving an instruction of the IoT platform, the NAT device finds a corresponding private IP address of an IoT device based on the public IP address of the IoT platform in the instruction and the public-private network address mapping between the private IP address of the IoT device and the public IP address of the IoT platform shown in Table 1. In this case, the NAT device may forward the instruction to the corresponding IoT device based on the private IP address of the IoT device.

TABLE 1

| Private IP address of the IoT device | Public IP address of the IoT platform |
|---|---|
| 192.168.0.1 | XXX.XXX.XXX.XXX |
| 192.168.0.2 | XXX.XXX.XXX.XXX |
| 192.168.0.2 | XXX.XXX.XXX.XXX |

FIG. 2 is a schematic diagram of an interface on which a user sends instructions to a device after logging in to an IoT platform according to an embodiment of this application. The interface in FIG. 2 includes a title bar, a function block, and a main interface. The title bar may display an XXX IoT platform and function buttons such as minimization, maximization, and close buttons. The function block includes function buttons, to perform functions such as adding a new IoT device, deleting an IoT device, or displaying my account information. The main interface displays a name, a location, and an available operation of the IoT device. The user of the IoT platform may connect to the IoT platform through an application (APP) on a terminal device, and send, through the IoT platform, an operation instruction to an IoT device associated with the user. For example, the user has a smart lock and establishes a connection to the IoT platform after installing the smart lock. Then, the user may log in to the IoT platform through an application on the terminal device to send an operation instruction to the smart lock. It can be learned from FIG. 2 that, after the user logs into the IoT platform, the user may see, by using an interface on the terminal device, an icon of the smart lock that has established the connection to the IoT platform. When the user needs to open a door, the user may tap an "open door" virtual button on the interface. In response to the tapping signal, the IoT platform sends an operation instruction to the smart lock through a NAT device. The operation instruction is used to instruct the smart lock to open the door. Similarly, through the IoT platform, the user may also send instructions such as recording and photographing to a camera, or send instructions such as playing music to a smart speaker.

Figure 3:
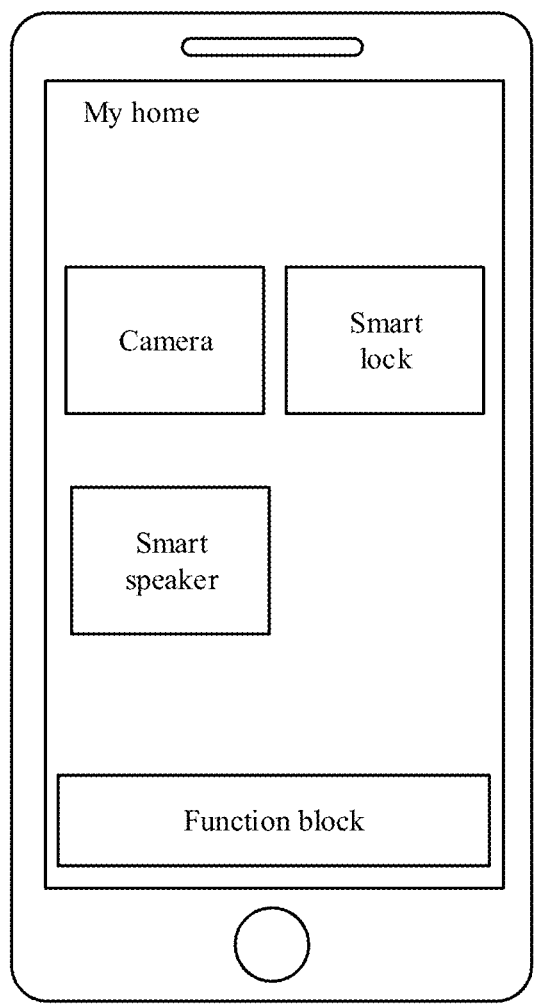
FIG. 3 is a schematic diagram of another interface on which a user sends instructions to a device after logging in to an IoT platform according to an embodiment of this application.
Figure 4:
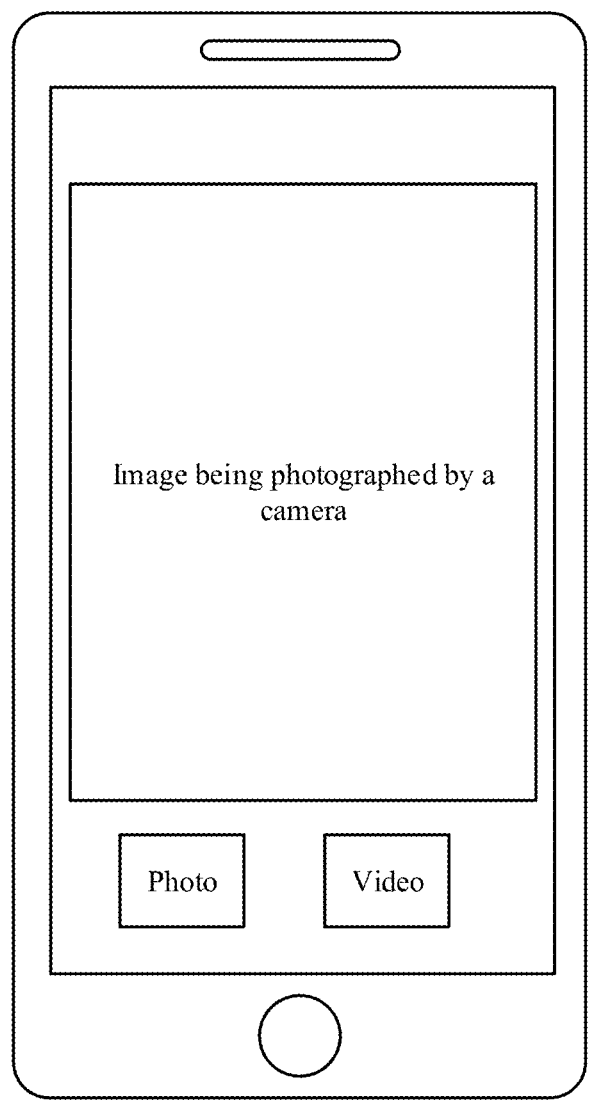
FIG. 4 is a schematic diagram of a detailed interface of an IoT device displayed on a terminal device according to an embodiment of this application.

FIG. 3 is a schematic diagram of another interface on which a user sends instructions to a device after logging in to an IoT platform according to an embodiment of this application. It may be understood that FIG. 2 is generally a schematic diagram of an interface on a terminal device with a relatively large screen such as a computer, a tablet, or a vehicle-mounted device, and FIG. 3 is a schematic diagram of an interface on a terminal device with a relatively small screen such as a mobile phone. The interface in FIG. 3 includes a location of an IoT device, a name of the IoT device, a function block, and the like. The location of the IoT device is "my home", that is, FIG. 3 shows an application scenario of a smart home. The function block includes function buttons, to perform functions such as adding a new IoT device, deleting an IoT device, or displaying my account information. The user taps, on the interface of the terminal device, an IoT name or a virtual button that displays the IoT name to enter a corresponding detailed interface. FIG. 4 is a schematic diagram of a detailed interface of an IoT device displayed on the terminal device according to an embodiment of this application. It can be learned that the interface is an interface diagram entered after the user taps a camera in FIG. 3. The interface in FIG. 4 includes an image that is being photographed by the camera and two virtual buttons: "photo" and "video". The user may observe, by using the terminal device, the image that is being photographed by the camera, and may separately tap the two virtual buttons: "photo" and "video" to send different operation instructions. For example, when the user taps the virtual button "photo", the terminal device sends an operation instruction to the IoT platform on a server, and the IoT platform generates a control instruction for the camera in response to the operation instruction, and forwards the control instruction to the camera through a NAT device. The control instruction is used to control the camera to photograph.

Figure 5:
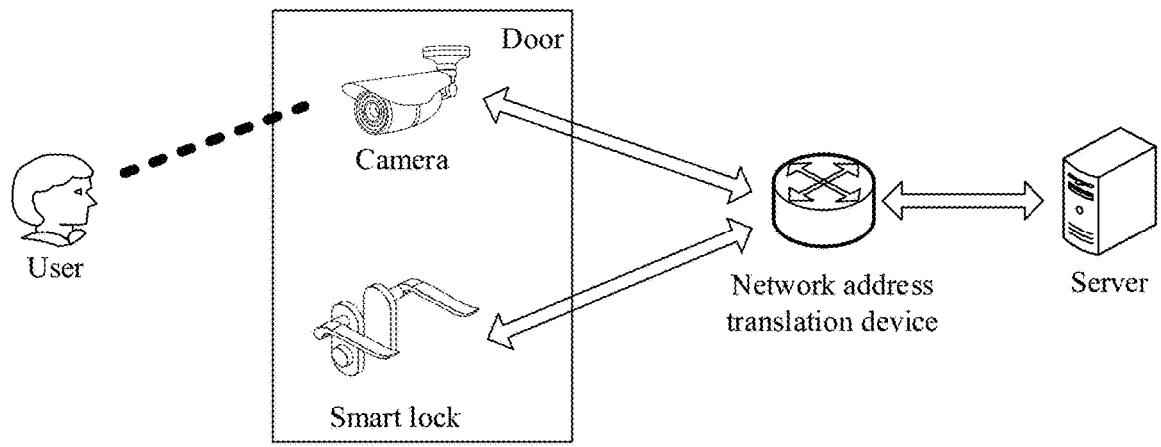
FIG. 5 is a schematic diagram in which an IoT platform automatically controls an IoT device according to an embodiment of this application.

The IoT platform may further automatically control an IoT device based on information about the IoT device. FIG. 5 is a schematic diagram in which the IoT platform automatically controls the IoT device according to an embodiment of this application. The user installs two IoT devices: a camera and a smart lock on the door, and set automatic door opening rules on the IoT platform. When the user arrives at the door, the camera captures a face of the user and uploads a face image to the IoT platform on the server through the NAT device. The IoT platform identifies, through a facial recognition technology, that the user is in front of the door. Then, the IoT platform automatically generates a door opening instruction based on a facial recognition result, and sends the door opening instruction to the smart lock through the NAT device. After receiving the instruction, the smart lock executes a door opening action, and the user can enter the home without a key.

However, the foregoing application scenarios are implemented when the IoT device maintains a connection to the IoT platform. The NAT device rewrites a destination address or a source address of a transmitted instruction by using a public-private network address mapping, to implement communication between the IoT device and the IoT platform. The public-private network address mapping is generally stored in the NAT device for only 2 minutes. If the NAT device does not receive a communication instruction between the IoT device and the IoT platform within 2 minutes, the public-private network address mapping between the IoT device and the IoT platform becomes invalid. When the public-private network address mapping between the IoT device and the IoT platform is invalid, after the IoT platform sends an instruction to the NAT device, the NAT device cannot translate a destination address of the instruction to the private IP address of the IoT device. Consequently, the NAT device cannot forward the instruction from the IoT platform, and the IoT platform cannot control the IoT device. In view of this, an embodiment of this application provides a cross-network wake-up method, so that when a public-private network address mapping between an IoT device and an IoT platform is invalid, the IoT device can still be woken up, and the public-private network address mapping between the IoT device and the IoT platform can be restored.

Figure 6:
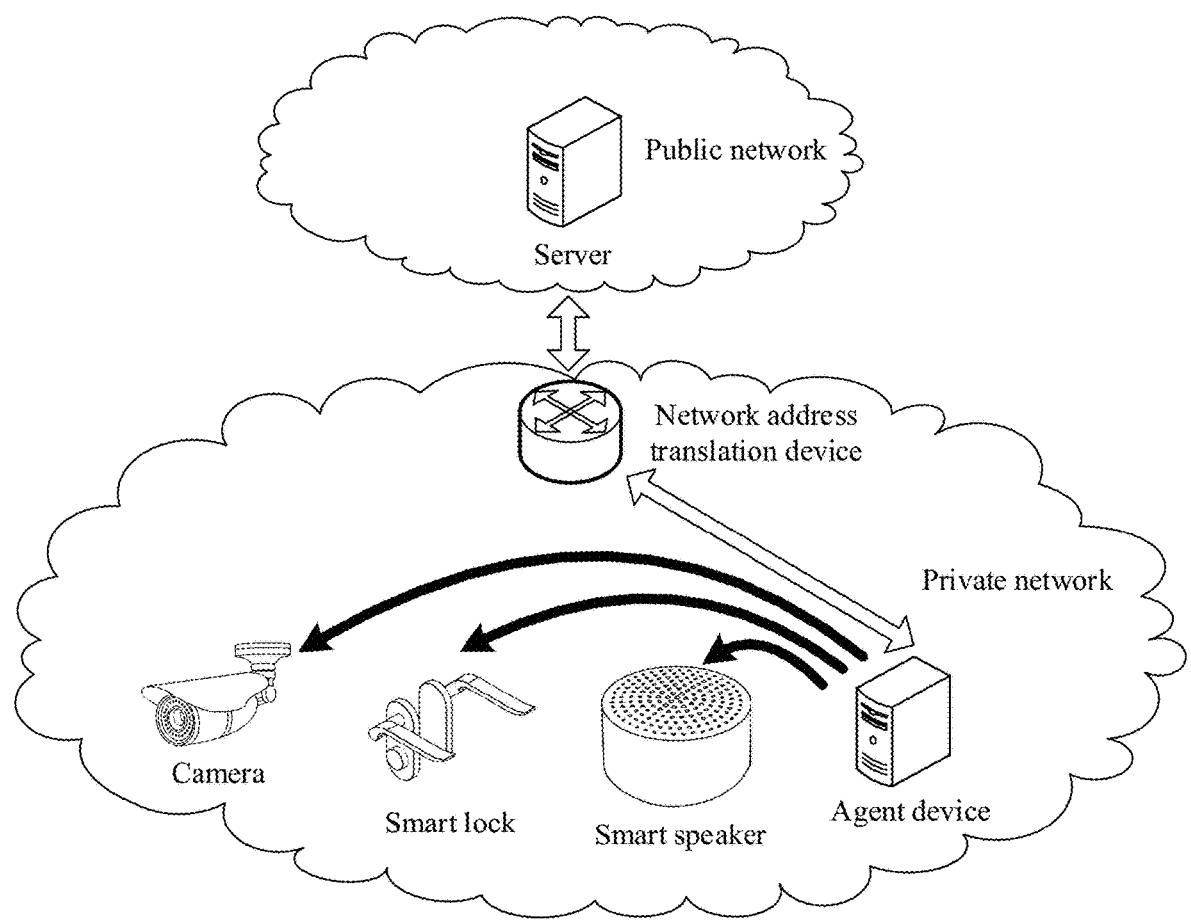
FIG. 6 is a schematic diagram of a system architecture of a cross-network wake-up method according to an embodiment of this application.

FIG. 6 is a schematic diagram of a system architecture of the cross-network wake-up method according to an embodiment of this application. It can be learned that an agent device is disposed on a private network in some embodiments of this application. The agent device is connected to a server on a public network through a NAT device, and an IoT platform is installed on the server. In addition, an IoT device is disposed on the same private network as the agent device. In other words, the agent device and the IoT device are on a same private network under a same NAT device, and the agent device and the IoT device each have a separate private IP address. For example, a private IP address of a camera is 192.168.0.1, a private IP address of a smart lock is 192.168.0.2, a private IP address of a smart speaker is 192.168.0.3, and a private IP address of the agent device is 192.168.0.5.

As shown in FIG. 6, the agent device establishes a heartbeat connection to the IoT platform through the NAT device, and sends a heartbeat message to the IoT platform at a preset interval. When forwarding the heartbeat message, the NAT device keeps a public-private network address mapping between the agent device and the IoT platform alive. For example, if the agent device sends a heartbeat message to the IoT platform at a regular time interval (e.g., every minute), the NAT device forwards the heartbeat information every minute. If the public-private network address mapping is generally stored for 2 minutes in the NAT device, the NAT device forwards the heartbeat information every minute, so that the public-private network address mapping can be always stored in the NAT device and does not become invalid. After an instruction of the IoT platform is sent to the NAT device, the NAT device can translate a destination address of the instruction into a private IP address of the agent device based on the keepalive public-private network address mapping between the agent device and the IoT platform, so that the instruction of the IoT platform can reach the agent device successfully.

As shown in FIG. 6, the agent device and the IoT device are disposed on the private network under the same NAT device, that is, are disposed on a same local area network. When the agent device needs to send an instruction to the IoT device, the agent device may send the instruction to the corresponding IoT device only through the private IP address of the private network. For example, when the agent device sends an instruction to the camera, the agent device sends an instruction whose destination address is 192.168.0.1. The instruction may be directly transmitted to the camera based on the destination address 192.168.0.1 without network address translation.

It may be understood that one agent device and N IoT devices may be disposed on a private network under a same NAT device. The agent device may be connected to a plurality of IoT platforms. After receiving a wake-up instruction of the IoT platform, the agent device may select, based on a private IP address of the IoT device in the wake-up instruction, the corresponding IoT device from the N IoT devices to send a message. As shown in FIG. 6, one agent device and three IoT devices (e.g., the camera, the smart lock, and the smart speaker) are disposed on the same private network.

Refer to FIG. 6. The IoT platform may send the wake-up instruction to the agent device through the NAT device. After the agent device receives the wake-up instruction, the agent device may send a wake-up message to the corresponding IoT device. After the IoT device receives the wake-up message sent by the agent device, the IoT device sends a connection request message to the IoT platform through the NAT device. After receiving the connection request message, the NAT device establishes a public-private network address mapping between the IoT device and the IoT platform, that is, restores the public-private network address mapping between the IoT device and the IoT platform. The IoT device is woken up, and an instruction of the IoT platform may reach the IoT device through the NAT device.

After logging in to the IoT platform, a user browses the interface shown in FIG. 2 or FIG. 3. The user may tap a virtual button for door opening on the interface, and the IoT platform checks a status of the smart lock in response to the tap. Because the smart lock does not generate data and report the data for a long duration, the status of the smart lock on the IoT platform may be offline. If the IoT platform detects that the status of the smart lock is offline, the IoT platform caches a door opening instruction, and sends a wake-up instruction of the smart lock to the agent device. After receiving the wake-up instruction of the smart lock, the agent device sends a wake-up message to the smart lock, so that the smart lock sends a connection request message to the IoT platform through the NAT device in response to the wake-up message. When forwarding the connection request message, the NAT device restores a public-private network address mapping between the smart lock and the IoT platform. After receiving the connection request message, the IoT platform modifies the status of the smart lock to online, and may send the cached door opening instruction to the smart lock through the NAT device. After receiving the door opening instruction, the smart lock performs a door opening operation, and the user may tap a virtual door opening button to open the door through the smart lock.

The IoT platform may alternatively automatically wake up a corresponding IoT device based on a preset computer program. For example, in FIG. 5, after the user arrives at the door, the camera captures the face of the user and uploads the face to the IoT platform. The IoT platform identifies, through the facial recognition technology, that the face is a face of the user, and the IoT platform performs an automatic door opening process. In other words, the IoT platform checks a status of the smart lock. If the status of the smart lock is online, the IoT platform directly sends a door opening instruction to the smart lock. If the status of the smart lock is offline, the IoT platform caches the door opening instruction, and sends a wake-up instruction of the smart lock to the agent device. After receiving the wake-up instruction of the smart lock, the agent device sends a wake-up message to the smart lock, so that the smart lock sends a connection request message to the IoT platform through the NAT device in response to the wake-up message. When forwarding the connection request message, the NAT device restores a public-private network address mapping between the smart lock and the IoT platform. After receiving the connection request message, the IoT platform modifies the status of the smart lock to online, and may send the cached door opening instruction to the smart lock through the NAT device. After receiving the door opening instruction, the smart lock performs a door opening operation. After the user arrives at the door, the camera captures the face of the user, and the smart lock is automatically unlocked after being woken up.

Figure 7:
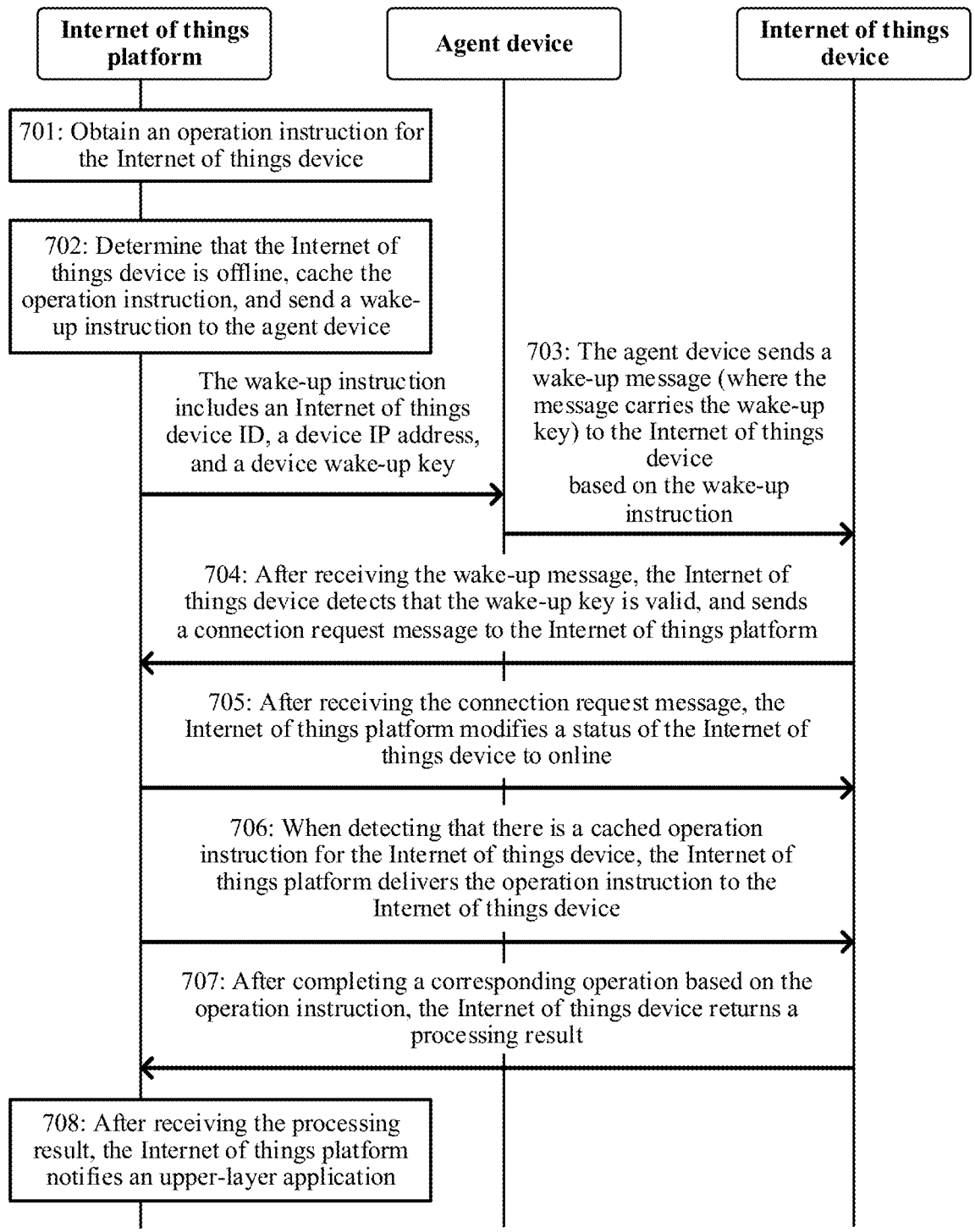
FIG. 7 is a schematic signaling diagram of a cross-network wake-up method according to an embodiment of this application.

FIG. 7 is a schematic signaling diagram of a cross-network wake-up method according to an embodiment of this application. It can be learned that the cross-network wake-up method provided in some embodiments of this application includes the following steps.

701: An IoT platform obtains an operation instruction for an IoT device.

In some embodiments of this application, when a user taps a virtual button on a terminal device, the terminal device sends a corresponding operation instruction to the IoT platform in response to tapping of the virtual button, and the IoT platform obtains the operation instruction for the IoT device. FIG. 2 is used as an example. After the user taps the virtual button of "door opening", the terminal device sends a door opening instruction to the IoT platform, and the IoT platform obtains the door opening instruction for the smart lock.

It may be understood that the IoT platform may automatically generate an operation instruction. For example, after receiving a signal of another IoT device, the IoT platform processes the signal according to a preset rule, and finally automatically generates an operation instruction and delivers the operation instruction to the corresponding IoT device. FIG. 5 is used as an example. After capturing the face of the user, the camera uploads the face to the IoT platform. If the IoT platform detects, through the facial recognition technology, that the face is a face of the user, the IoT platform automatically generates a door opening instruction for the smart lock. In other words, the IoT platform obtains an automatically generated operation instruction for the IoT device.

702: The IoT platform determines that the IoT device is offline, caches the operation instruction, and sends a wake-up instruction to an agent device.

In some embodiments of this application, after obtaining the operation instruction, the IoT platform may detect whether the IoT device corresponding to the operation instruction is offline, and directly deliver the operation instruction to the IoT device if a status of the IoT device is online. When the status of the IoT device is online, it indicates that the IoT device maintains a connection to the IoT platform, a NAT device stores a public-private network address mapping between the IoT device and the IoT platform, and the IoT platform may directly deliver the operation instruction to the IoT device. The NAT device can forward the operation instruction based on the public-private network address mapping, and the IoT device can receive the operation instruction. If the status of the IoT device is offline, the IoT platform needs to first wake up the IoT device and then deliver the operation instruction to the IoT device. The IoT platform may cache the operation instruction, and send a wake-up instruction to the agent device.

In a possible embodiment, before sending the wake-up instruction to the agent device, the IoT platform may first determine, based on the function information of the IoT device, whether the IoT device supports wake-up. For example, the IoT platform reads that the function information of the IoT device is wake-up support information. In this case, the IoT platform may send the wake-up instruction to the agent device. The function information of the IoT device is stored on the IoT platform during registration of the IoT device. In implementations, refer to the registration embodiment of the IoT device in the embodiments of this application. Details are not described herein again.

The wake-up instruction generally includes an identity (ID) of the IoT device and a private IP address of the device, and may further include a wake-up key of the IoT device. The wake-up key is used for security verification. The IoT device ID is used to determine the IoT device that executes the operation instruction, and the private IP address of the device is used to indicate a destination address of the wake-up message sent by the agent device. For example, if the IoT platform delivers an operation instruction related to the smart lock, the wake-up instruction includes a device ID of the smart lock, a private IP address 192.168.0.2 of the smart lock, and a wake-up key of the smart lock.

In a possible embodiment, a private network includes a plurality of agent devices. In this case, the IoT platform may first determine, based on a target private network segment of an agent device to which the private IP address of the IoT device belongs, the agent device corresponding to the IoT device. Then, the IoT platform may send the wake-up instruction to the corresponding agent device. The target private network segment of the agent device represents one or more private IP addresses served by the agent device. Table 2 is a data table of target private network segments of agent devices. It can be learned that each agent device on a private network under one NAT device separately serves a different network segment, that is, serves different IoT devices. For example, if a private IP address of an IoT device is 192.168.0.100, the IoT platform determines that the private IP address belongs to a target private network segment from 192.168.0.1 to 192.168.0.255. In this case, an agent device corresponding to the IoT device is an agent device 1, and the IoT platform may send the wake-up instruction to the agent device 1.

TABLE 2

| Agent device | Target private network segment |
| --- | --- |
| Agent device 1 | 192.168.0.1 to 192.168.0.255 |
| Agent device 2 | 192.168.1.1 to 192.168.1.255 |
| Agent device 3 | 192.168.2.1 to 192.168.2.255 |

703: The agent device sends a wake-up message to the IoT device based on the wake-up instruction.

In some embodiments of this application, after receiving the wake-up instruction, the agent device may send the wake-up message to the IoT device based on the wake-up instruction. First, the agent device generates the wake-up message based on the wake-up instruction. A destination address of the wake-up message is the private IP address of the device in the wake-up instruction, and the wake-up message may include the IoT device ID and the wake-up key.

For example, after receiving a wake-up instruction for a smartlock (e.g., smart lock), the agent device may generate a wake-up message for the smart doorbell based on the wake-up instruction. A destination address of the wake-up message is the private IP address 192.168.0.2 of the smart doorbell. The wake-up message may further include a wake-up key of the smart doorbell.

Then, the agent device sends the wake-up message to the IoT device. If the agent device and the IoT device are disposed on a same private network under a same NAT device, the wake-up message may directly reach the corresponding IoT device based on the private IP address.

704: After receiving the wake-up message, the IoT device detects that the wake-up key is valid, and sends a connection request message to the IoT platform.

In some embodiments of this application, after receiving the wake-up message, the IoT device reads the wake-up key from the wake-up message, and detects whether the wake-up key is valid. If the wake-up key is valid, the IoT device sends the connection request message to the IoT platform. A method in which the IoT device detects whether the wake-up key is valid may be: The IoT device compares the obtained wake-up key with a wake-up key stored in the IoT device, and if the keys are consistent, the IoT device determines that the wake-up key is valid.

In a possible embodiment, after receiving the wake-up message, the IoT device may read the IoT device ID and the wake-up key from the wake-up message, and determine, based on the IoT device ID and the wake-up key, whether the wake-up message is valid. If the wake-up message is valid, the IoT device sends the connection request message to the IoT platform. A method in which the IoT device determines, based on the IoT device ID and the wake-up key, whether the wake-up message is valid is similar to an account password verification method. This is not specifically limited herein.

The IoT device may send the connection request message to the IoT platform through the NAT device. When the connection request message reaches the NAT device, a destination address is translated into a public IP address of the IoT platform by using the public-private network address mapping on the NAT device. Then, the message is sent to the IoT platform. The connection request message may include the IoT device ID, the private IP address of the IoT device, authentication information, and the like. The authentication information is used when the IoT device establishes a connection to the IoT platform. The IoT platform verifies permission of the IoT device based on the authentication information. If the verification succeeds, the IoT platform establishes the connection to the IoT device, records the private IP address of the IoT device, and modifies the status of the IoT device to online.

705: After receiving the connection request message, the IoT platform modifies the status of the IoT device to online.

It may be understood that after receiving the connection request message, the IoT platform determines the IoT device ID and the private IP address of the IoT device based on the connection request message. The IoT platform may find corresponding IoT device data in a database based on the IoT device ID, and modifies a status of an IoT device in the corresponding IoT device data to online. The IoT platform may further store the private IP address of the IoT device. When generating the wake-up instruction, the IoT platform may add the stored private IP address of the IoT device to the wake-up instruction.

FIG. 8 is a schematic diagram of an interface before the IoT platform modifies the status of the IoT device according to an embodiment of this application. The user may log in to the IoT platform through the terminal device, to view the interface shown in FIG. 8. Although a status of a smart lock on the interface is offline, the user may still tap a door opening virtual button. In this case, the IoT platform may first wake up the smart lock, and then deliver a door opening instruction.

FIG. 9 is a schematic diagram of an interface after the IoT platform modifies the status of the IoT device according to an embodiment of this application. The user may log in to the IoT platform through the terminal device, to view the image shown in FIG. 9. It can be learned that the IoT platform modifies a status of the smart lock to online and displays the status on the interface, so that the user can see that the status of the smart lock changes to online.

706: When detecting that there is a cached operation instruction for the IoT device, the IoT platform delivers the operation instruction to the IoT device.

In some embodiments of this application, after receiving the connection request message, the IoT platform may further detect whether there is a corresponding cached operation instruction for the IoT device. If the IoT platform detects that there is a cached operation instruction, the IoT platform sends the operation instruction to the IoT device through the NAT device based on the private IP address in the connection request message of the IoT device. After receiving the operation instruction, the NAT device transmits the operation instruction to the corresponding IoT device based on the public-private network address mapping on the NAT device.

707: After completing a corresponding operation based on the operation instruction, the IoT device returns a processing result.

In some embodiments of this application, after receiving the operation instruction, the IoT device completes the corresponding operation. For example, after receiving the door opening instruction, the smart lock performs a door opening operation, for example, controls a motor to rotate to open a latch, and returns a processing result to the IoT platform after the execution is complete. The processing result returned by the smart lock may be door opening success information or door opening failure information.

708: After receiving the processing result, the IoT platform notifies an upper-layer application.

In some embodiments of this application, after receiving the processing result, the IoT platform sends a notification message to the upper-layer application of the terminal device. The notification message is used to indicate the processing result. For example, after successfully opening the door, the smart lock returns the door opening success information to the IoT platform.

In this case, the IoT platform updates smart lock status information on the IoT platform. In addition, the IoT platform may further send a notification message to a mobile phone of the user, so that the mobile phone of the user receives a door opening success notification, and the mobile phone of the user may further display the notification message.

It may be understood that the upper-layer application is generally installed on the terminal device of the user. The terminal device includes but is not limited to a device such as a computer, a tablet, or a mobile phone. The upper-layer application may be a dedicated client, a computer program, or mobile software. In actual application, the upper-layer application may be a web page, or the like. Details are not described herein.

Figure 10:
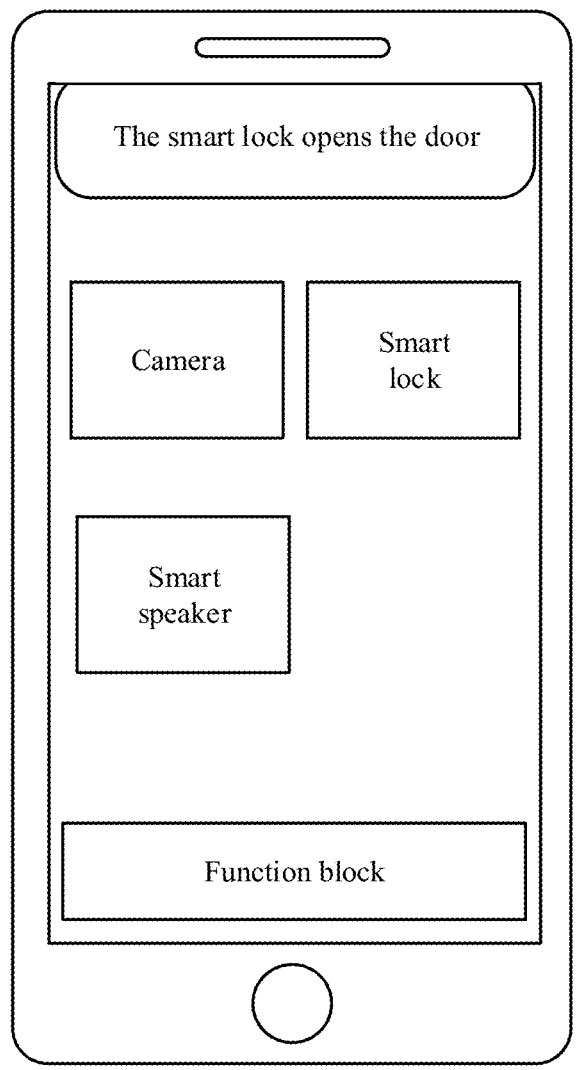
FIG. 10 is a schematic diagram of an interface on which an upper-layer application displays a notification message according to an embodiment of this application.

FIG. 10 is a schematic diagram of an interface on which the upper-layer application displays the notification message according to an embodiment of this application. It can be learned that after receiving the notification message of the IoT platform, the upper-layer application on the terminal device of the user may pop up, by using an operating system, a notification indicating that the smart lock is unlocked on the interface of the terminal device of the user. In this case, the user may immediately become aware that the door opening operation of the smart lock is completed. In addition, the upper-layer application may further display how the smart lock opens the door in another part of the interface. Details are not described herein again.

Figure 11:
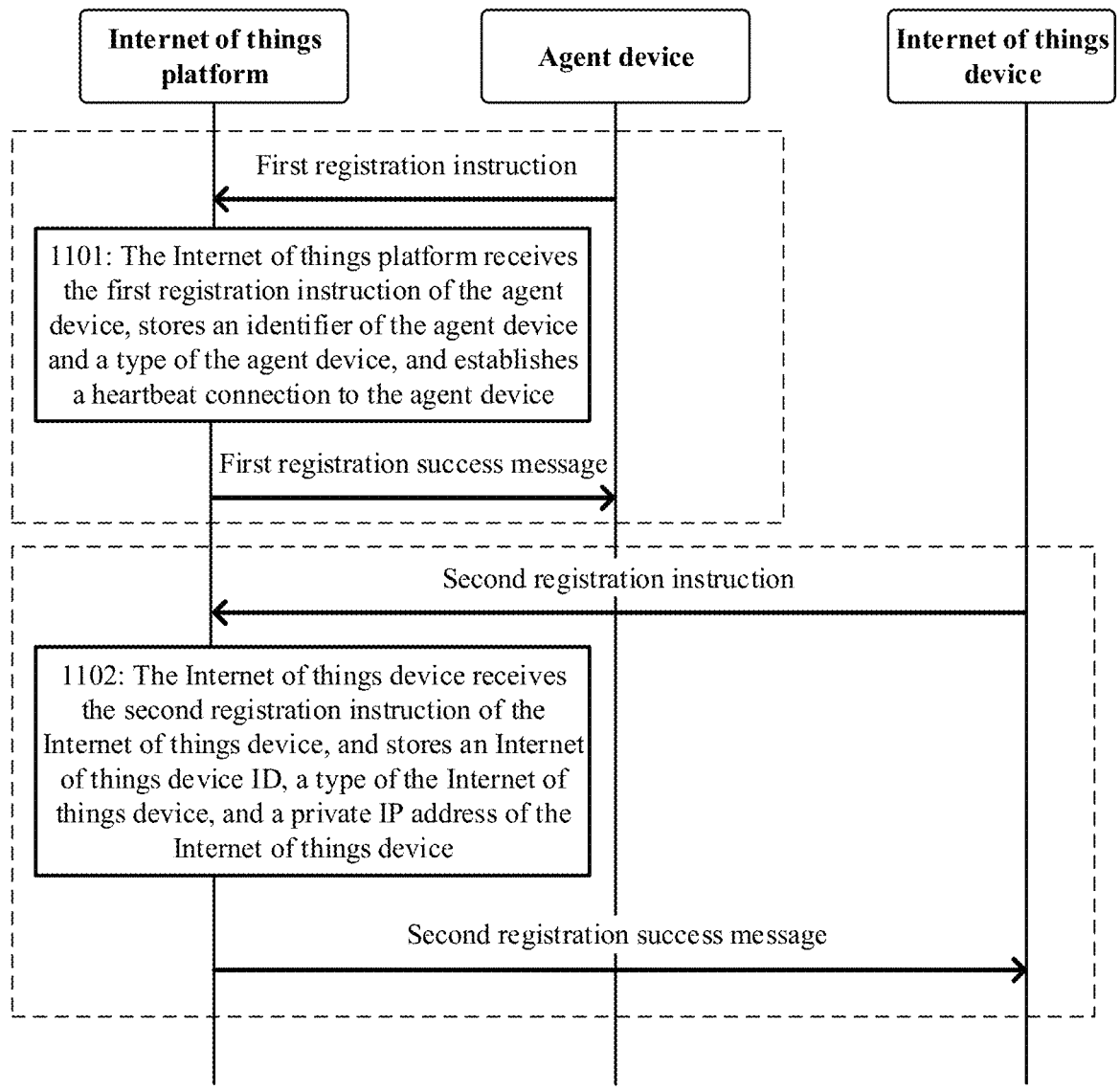
FIG. 11 is a schematic signaling diagram of registration on an IoT platform by an agent device and an IoT device according to an embodiment of this application.

The following describes in detail a process, according to embodiments, in which an agent device and an IoT device are registered on an IoT platform. FIG. 11 is a schematic signaling diagram of registration on the IoT platform by the agent device and the IoT device according to an embodiment of this application. It can be learned that a registration process includes the following steps.

1101: The IoT platform receives a first registration instruction of the agent device, stores an identifier of the agent device and a type of the agent device, and establishes a heartbeat connection to the agent device.

In some embodiments of this application, after receiving the first registration instruction of the agent device, the IoT platform may determine information such as the identifier of the agent device and the type of the agent device based on the first registration instruction, and store the information such as the identifier of the agent device and the type of the agent device to the IoT platform. In addition, the IoT platform may maintain the heartbeat connection to the agent device through a NAT device, to keep a public-private network address mapping between the IoT platform and the agent device alive.

In a possible embodiment, there is a plurality of agent devices on a private network under the NAT device, and the IoT platform receives a plurality of first registration instructions. In this case, the IoT platform may separately store information about each agent device to the IoT platform, and maintain a heartbeat connection to each agent device, to keep a public-private network address mapping between the IoT platform and each agent device alive.

In a possible embodiment, the IoT platform sets a target private network segment of the agent device. The IoT platform may determine the target private network segment of the agent device during registration of the agent device. For example, there is only one agent device on the private network under the NAT device, and a network segment of the private network under the NAT device is from 192.168.0.1 to 192.168.2.255. In this case, the IoT platform may set a target private network segment of the agent device to 192.168.0.1 to 192.168.2.255, that is, a full network segment, and the agent device serves all IoT devices on the private network. For another example, there are three agent devices on the private network under the NAT device, and a network segment of the private network under the NAT device is 192.168.0.1 to 192.168.3.255. In this case, the IoT platform may set target private network segments of the agent devices to 192.168.0.1 to 192.168.0.255, 192.168.1.1 to 192.168.1.255, and 192.168.2.1 to 192.168.2.255 respectively. The three agent devices each serve a target private network segment, as shown in Table 2.

In a possible embodiment, the IoT platform may store a registered device based on information such as a device identifier, a device type parameter, and a device IP address. In this case, the IoT platform may store a type of the agent device as an agent device, and store a type of the IoT device as an IoT device. In actual application, one (1) may be used to represent an agent device, and two (2) may be used to represent an IoT device. In other words, the device type parameter being 1 indicates that the device is an agent device, and the device type parameter being 2 indicates that the device is an IoT device. There may be another representation manner, and this is not specifically limited herein.

In a possible embodiment, after establishing the heartbeat connection to the agent device, the IoT platform may send a first registration success message to the agent device, to indicate that the agent device is successfully registered. In an implementation, the first registration success message may include the target private network segment of the agent device, to indicate a network segment served by the agent device. In another implementation, the first registration success message further includes information such as the identifier of the agent device.

1102: The IoT platform receives a second registration instruction of the IoT device, and stores an IoT device ID, a type of the IoT device, and a private IP address of the IoT device.

In some embodiments of this application, after receiving the second registration instruction of the IoT device, the IoT platform may obtain and store the IoT device ID, the type of the IoT device, and the private IP address of the IoT device. When generating a wake-up instruction, the IoT device may generate the wake-up instruction based on the IoT device ID and the private IP address of the IoT device. The wake-up instruction includes the IoT device ID and the private IP address of the IoT device.

In a possible embodiment, the IoT platform may further obtain and store a wake-up key of the IoT device. The wake-up key may be generated by the IoT device according to a specific algorithm, and then the IoT device sends the generated wake-up key to the IoT platform. The generated wake-up key may be carried in the second registration instruction. The algorithm for generating the key is not specifically limited in some embodiments of this application. In a possible implementation, the wake-up key may alternatively be input and set by a user. In other words, after the user inputs and sets the wake-up key, the IoT device sends the wake-up key set by the user to the IoT platform. The wake-up key may be carried in the second registration instruction.

In a possible embodiment, the IoT platform may automatically allocate a wake-up key to the IoT device, where the wake-up key is automatically generated by the IoT platform according to a specific algorithm. In an implementation, the IoT platform generates a plurality of wake-up keys, then sequentially allocates the wake-up keys to IoT devices, and sends the wake-up keys to the corresponding IoT devices. In another implementation, the IoT platform generates the wake-up key based on the second registration instruction from the IoT device, and sends the wake-up key to the IoT device. The algorithm for generating the key is not specifically limited in these embodiments of this application.

In a possible embodiment, the IoT platform may obtain and store function information of the IoT device, and the function information may be carried in the second registration instruction sent by the IoT device to the IoT platform. The function information may include wake-up support information and command forwarding support information. The wake-up support information is used to indicate that the IoT device supports a wake-up mode. When the IoT device supports the wake-up mode, the IoT platform sends the wake-up instruction to the agent device, so that the agent device sends a wake-up message to the IoT device, to wake up the IoT device. The command forwarding support information is used to indicate that the IoT device supports a command forwarding mode. When the IoT device supports the command forwarding mode, reference may be made to another embodiment of this application. Details are not described herein again. In some embodiments, after obtaining an operation instruction for the IoT device, the IoT platform first determines, based on the function information corresponding to the IoT device, a mode supported by the IoT device. For example, if the IoT platform determines that the IoT device supports the wake-up mode, the IoT platform may perform a corresponding cross-network wake-up method. For another example, if the IoT platform determines that the IoT device supports the command forwarding mode, the IoT platform may perform a corresponding method for the command forwarding mode. Alternatively, for example, if the IoT platform determines that the IoT device supports both the wake-up mode and the command forwarding mode, the IoT platform may preferentially perform, according to a preset rule, a method corresponding to either of the modes, or perform methods corresponding to both modes. This is not limited in these embodiments of this application.

In a possible embodiment, after storing the IoT device ID, the type of the IoT device, and the private IP address of the IoT device, the IoT platform may send a second registration success message to the IoT device, to indicate that the IoT device is successfully registered. In a possible implementation, the second registration success message carries the IoT device ID and the wake-up key. When the IoT device receives the wake-up message sent by the agent device, the IoT device may check the IoT device ID and the wake-up key with the IoT device ID and the wake-up key in the wake-up message. If the IDs and the wake-up keys are the same, verification succeeds, and the IoT device may send a connection request message to the IoT platform in response to the wake-up message. If the IDs and the wake-up keys are different, the verification fails. This indicates that an error occurs and the IoT device will not be woken up temporarily.

In a possible embodiment, the IoT platform may obtain and store the IoT device ID and a login password. The IoT device ID and the login password may be carried in the second registration instruction sent by the IoT device to the IoT platform. When the IoT device is connected to the IoT platform again, the IoT device may perform verification or authentication by using the IoT device ID and the login password.

FIG. 12 is a schematic diagram of an interface on which the IoT platform displays registered devices according to an embodiment of this application. It can be learned that an administrator of the IoT platform may log in to the IoT platform to view which devices are registered on the IoT platform. As shown in FIG. 12, registered devices on the IoT platform include a camera, a smart lock, and an agent device 1. Device type parameters of the camera and the smart lock being 2 indicates that the camera and the smart lock are IoT devices, and a device type parameter of the agent device 1 being 1 indicates that a device type of the agent device 1 is an agent device. Cases of the camera and the smart lock are similar to those in other embodiments of this application. Details are not described herein again. In some embodiments of this application, the administrator may tap a virtual button of "specify a target private network segment" on the interface, to reallocate a target private network segment to the agent device. In a possible implementation, in response to that the virtual button of "specify a target private network segment" is tapped, the IoT platform pops up an input box of the target private network segment (where the input box is not shown in FIG. 12). After the administrator inputs the target private network segment, the IoT platform generates a target private network segment update instruction, and sends the target private network segment update instruction to the agent device, so that the agent device updates the network segment served by the agent device to the target private network segment in the target private network segment instruction. In a possible implementation, in response to that the virtual button of "specify a target private network segment" is tapped, the IoT platform automatically generates an appropriate target private network segment according to a specific algorithm, and sends the appropriate target private network segment to the agent device, so that the agent device updates the network segment served by the agent device to the appropriate target private network segment. The algorithm for generating the target private network segment by the IoT platform is not specifically limited in these embodiments of this application.

Figure 13:
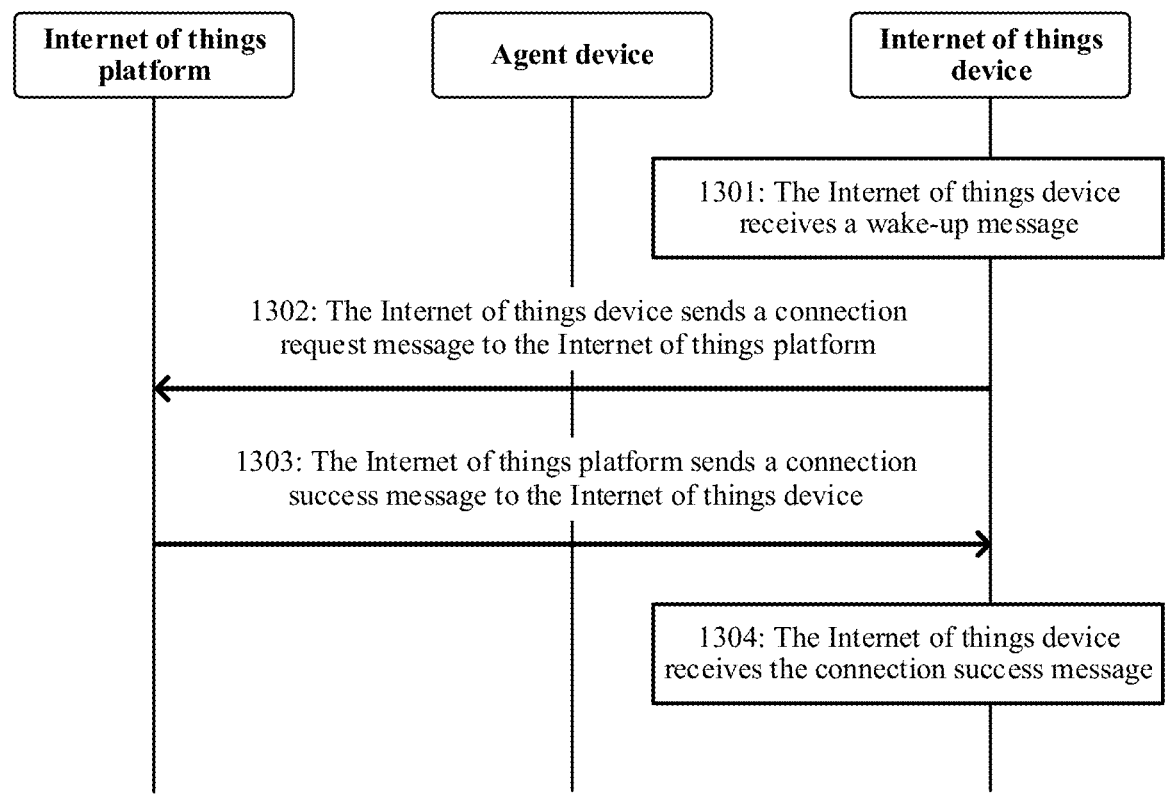
FIG. 13 is a schematic signaling diagram of establishing a connection between an IoT device and an IoT platform according to an embodiment of this application.

The following describes in detail a process in which an IoT device establishes a connection to an IoT platform after the IoT device receives a wake-up message. FIG. 13 is a schematic signaling diagram of establishing the connection between the IoT device and the IoT platform according to an embodiment of this application. It can be learned that the process includes the following steps.

1301: The IoT device receives the wake-up message.

In some embodiments of this application, the IoT device receives a wake-up message of an agent device, and the wake-up message may include an IoT device ID and a wake-up key. In a possible embodiment, the IoT device reads the IoT device ID and the wake-up key from the wake-up message, and determine, based on the IoT device ID and the wake-up key, whether the wake-up message is valid. If the wake-up message is valid, the IoT device sends a connection request message to the IoT platform.

1302: The IoT device sends the connection request message to the IoT platform.

It may be understood that the IoT device sends the connection request message to the IoT platform through a NAT device, and a public-private network address mapping between the IoT device and the IoT platform is established on the NAT device. With the public-private network address mapping, the IoT platform may send an operation instruction to the IoT device through the NAT device.

In a possible embodiment, the connection request message sent by the IoT device to the IoT platform includes the IoT device ID and a private IP address of the IoT device. After receiving the connection request message, the IoT platform stores the IoT device ID and the private IP address of the IoT device that are in the connection request message. When the IoT platform needs to wake up the IoT device, the IoT platform may generate a wake-up instruction based on the IoT device ID and the private IP address of the IoT device, and the wake-up instruction carries the IoT device ID and the private IP address of the IoT device.

1303: The IoT platform sends a connection success message to the IoT device.

In a possible embodiment, the connection request message sent by the IoT device to the IoT platform includes authentication information. After verifying that the authentication information meets a condition, the IoT platform sends the connection success message to the IoT device. In a possible implementation, the authentication information may be the IoT device ID and a login password of the IoT device, and the IoT device ID and the login password of the IoT device may be specified during registration of the IoT device. Details are not described herein again. The IoT platform may verify whether the IoT device ID and the login password of the IoT device are correct. If the ID and the login password are correct, the IoT device is successfully connected, and the IoT platform may send the connection success message to the IoT device. In another possible implementation, the authentication information is a digital signature of the IoT device, and the digital signature may be specified during registration of the IoT device. Details are not described herein again. The IoT platform may verify whether the digital signature is correct. If the digital signature is correct, the IoT device is successfully connected, and the IoT platform may send the connection success message to the IoT device. In actual application, there may be another authentication manner, and this is not specifically limited herein.

1304: The IoT device receives the connection success message.

In some embodiments of this application, after receiving the connection success message sent by the IoT platform, the IoT device confirms that the connection is successful, and an online function of the IoT device may be implemented. For example, a camera uploads video content or content that is being photographed to the IoT platform. After obtaining, by using a fingerprint module on a smart lock, a fingerprint of a user opening the door, the smart lock uploads the fingerprint to the IoT platform. In actual application, there may be another online function of the IoT device, and this is not specifically limited herein.

Figure 14:
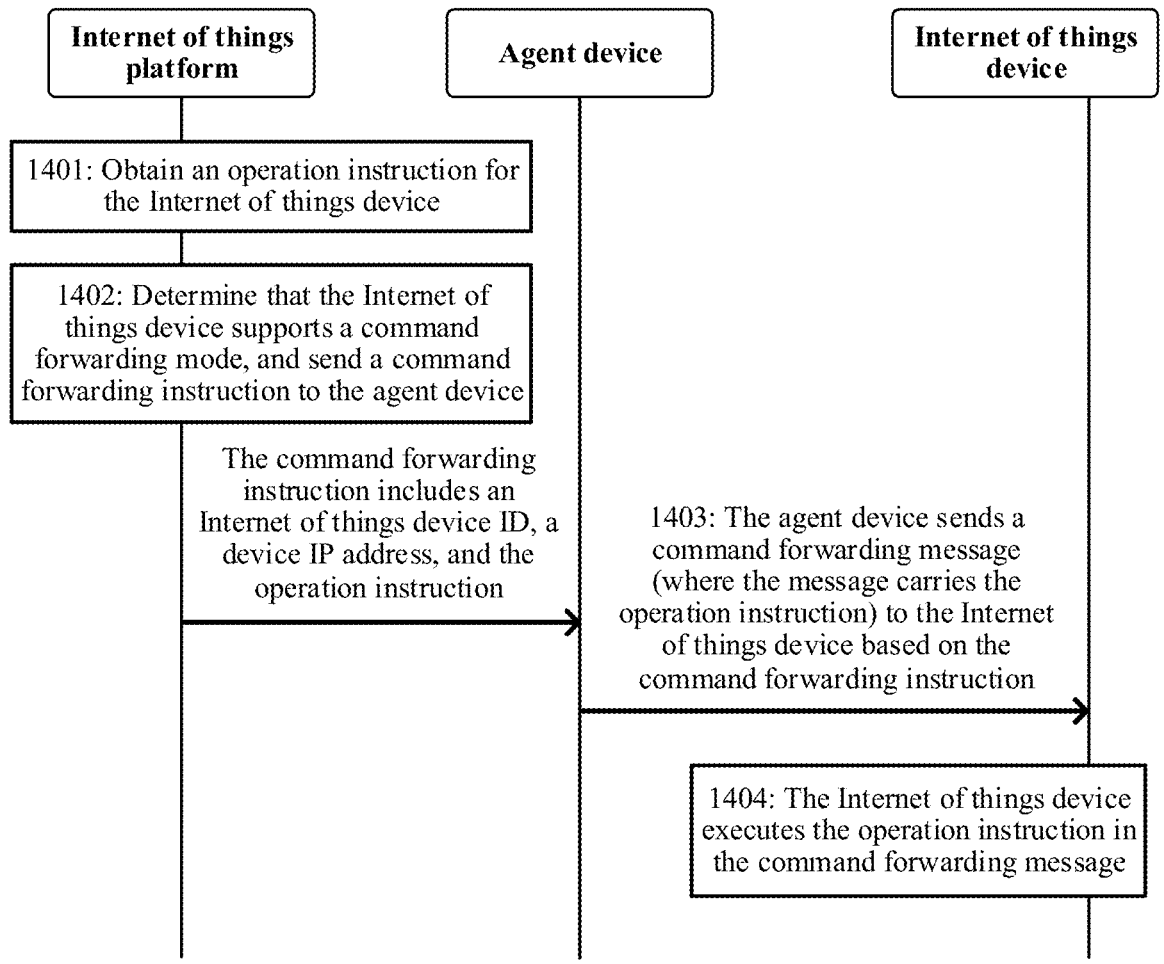
FIG. 14 is a schematic signaling diagram when an IoT device supports a command forwarding mode according to an embodiment of this application.

In some embodiments, the IoT platform may obtain and store function information of the IoT device, and the function information may be carried in a second registration instruction sent by the IoT device to the IoT platform. The function information may include wake-up support information and command forwarding support information. The IoT platform may determine, by using the function information, a function mode supported by the IoT device. For details, refer to the foregoing embodiments. In some embodiments, the IoT device supports only a wake-up mode. In this case, for an interaction process of the IoT platform, the agent device, and the IoT device, refer to the foregoing embodiments. Details are not described herein again. In some other embodiments, the IoT device supports only a command forwarding mode. In some other embodiments, the IoT device supports both the wake-up mode and the command forwarding mode. The following describes in detail an interaction process of the IoT platform, the agent device, and the IoT device when the IoT device supports the command forwarding mode. FIG. 14 is a schematic signaling diagram when the IoT device supports the command forwarding mode according to an embodiment of this application. It can be learned that the interaction process includes the following steps.

1401: Obtain an operation instruction for the IoT device.

In some embodiments of this application, step 1401 is similar to step 701 in the foregoing embodiments corresponding to FIG. 7. Details are not described herein again. It may be understood that the operation instruction may include an IoT device ID, to indicate a specific IoT device that implements the operation instruction. For example, an operation instruction for door opening is generally implemented by a smart doorbell, and the operation instruction for door opening generally includes an ID of the smart doorbell.

1402: Determine that the IoT device supports the command forwarding mode, and send a command forwarding instruction to the agent device.

In some embodiments of this application, the IoT platform determines, based on the function information of the IoT device, whether the IoT device supports the command forwarding mode. The function information may include the wake-up support information and the command forwarding support information. The wake-up support information is used to indicate that the IoT device supports the wake-up mode. The command forwarding support information is used to indicate that the IoT device supports the command forwarding mode. When detecting that the function information of the IoT device includes the command forwarding support information, the IoT platform may determine that the IoT device supports the command forwarding mode. After determining that the IoT device supports the command forwarding mode, the IoT platform may send the command forwarding instruction to the agent device.

When sending the command forwarding instruction to the agent device, the IoT platform may first determine a target private network segment of an agent device to which the private IP address of the IoT device belongs, to determine the agent device corresponding to the IoT device. Then, the IoT platform may send the command forwarding instruction to the corresponding agent device. Description is provided with reference to Table 2. For example, if a private IP address of an IoT device is 192.168.0.100, the IoT platform determines that the private IP address belongs to a target private network segment from 192.168.0.1 to 192.168.0.255. In this case, an agent device corresponding to the IoT device is the agent device 1, and the IoT platform may send a command forwarding instruction to the agent device 1.

In some embodiments of this application, the command forwarding instruction may include an operation instruction. After receiving the command forwarding instruction, the agent device generates a command forwarding message, where the command forwarding message carries the operation instruction. When receiving the command forwarding message, the IoT device may execute the operation instruction in the forwarding message.

In a possible embodiment, the command forwarding instruction may further include the private IP address of the IoT device. The IoT platform may obtain and store the private IP address of the IoT device during registration of the IoT device, or may obtain and store the private IP address of the IoT device when the IoT device is connected to the IoT platform. This is not specifically limited herein. Then, the IoT platform generates the command forwarding instruction that includes the private IP address of the IoT device. After receiving the command forwarding instruction, the agent device generates a command forwarding message based on the private IP address of the IoT device in the command forwarding instruction, where a destination address of the command forwarding message is the private IP address of the IoT device, so that the command forwarding message can be smoothly transmitted to the IoT device on a private network.

In a possible embodiment, the command forwarding instruction further includes the IoT device ID and a key, and the IoT device ID and the key may be stored in the IoT platform during registration of the IoT device or when the IoT device is connected to the IoT platform. After receiving the command forwarding instruction, the agent device may generate a command forwarding message that includes the IoT device ID and the key. When receiving the command forwarding message, the IoT device may perform verification based on the IoT device ID and the key. A verification method is similar to an account password verification method, and details are not described herein again. After the authentication succeeds, the IoT device may execute the operation instruction in the command forwarding message.

1403: The agent device sends the command forwarding message to the IoT device based on the command forwarding instruction.

In some embodiments of this application, after receiving the command forwarding instruction, the agent device may generate the command forwarding message based on the private IP address of the IoT device in the command forwarding instruction, where the destination address of the command forwarding message is the private IP address of the IoT device, so that the command forwarding message can be successfully transmitted to the IoT device on the private network.

In some embodiments of this application, the command forwarding message sent by the agent device to the IoT device includes an operation instruction, and the operation instruction comes from the command forwarding instruction sent by the IoT platform to the agent device. When receiving the command forwarding message, the IoT device may execute the operation instruction in the forwarding message.

In a possible embodiment, the command forwarding message may include the IoT device ID and the key. The IoT device ID and the key may be transmitted to the agent device by using the command forwarding instruction. Then, the agent device generates, based on the command forwarding instruction, the command forwarding message that carries the IoT device ID and the key. When receiving the command forwarding message, the IoT device may perform verification based on the IoT device ID and the key. A verification method is similar to the account password verification method, and details are not described herein again. After the authentication succeeds, the IoT device may execute the operation instruction in the forwarding message.

1404: The IoT device executes the operation instruction in the forwarding message.

In some embodiments of this application, the command forwarding message received by the IoT device includes the operation instruction, and in response to the command forwarding message, the IoT device executes the operation instruction in the forwarding message. For example, the IoT device is a smart doorbell, and the command forwarding message includes an operation instruction for door opening. After receiving the command forwarding message, the smart doorbell may execute the operation instruction for door opening, so that the user can enter the house.

In a possible embodiment, the command forwarding message includes the IoT device ID and the key. When receiving the command forwarding message, the IoT device may perform verification based on the IoT device ID and the key. A verification method is similar to the account password verification method, and details are not described herein again. After the authentication succeeds, the IoT device may execute the operation instruction in the forwarding message.

For a registration process of the IoT device and a registration process of the agent device when the IoT device supports the command forwarding mode, refer to the embodiments corresponding to FIG. 11. Details are not described herein again.

In the embodiments of this application, the agent device, the IoT platform, and the IoT device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. In an actual implementation, another division manner may be used.

Figure 15:
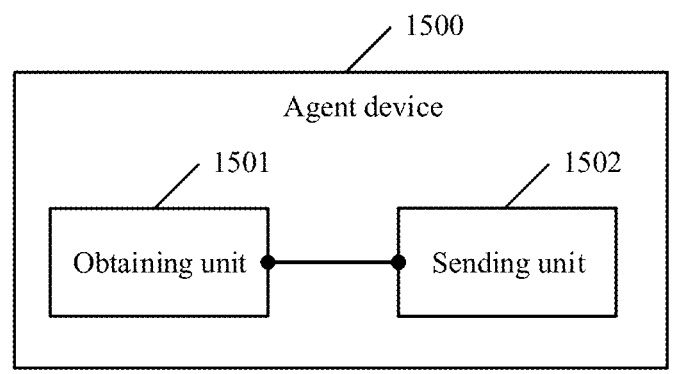
FIG. 15 is a possible schematic composition diagram of an agent device.

When each function module is obtained through division based on each corresponding function. FIG. 15 is a possible schematic composition diagram of the agent device in the foregoing embodiments. An agent device 1500 can perform the steps performed by the agent device in any one of the method embodiments of this application. The agent device 1500 may include an obtaining unit 1501 and a sending unit 1502.

The obtaining unit 1501 is configured to perform or support the agent device in performing the method described in the embodiments of this application. For example, the obtaining unit 1501 is configured to: obtain a wake-up instruction from an IoT platform, obtain a first registration success message from the IoT platform, and obtain a command forwarding instruction from the IoT platform.

The sending unit 1502 is configured to perform or support the agent device in performing the method described in the embodiments of this application. For example, the sending unit 1502 is configured to: perform or support the agent device in performing step 703 in the cross-network wake-up method shown in FIG. 7, send a first registration instruction to the IoT platform, and perform or support the agent device in performing step 1403 in the process shown in FIG. 14.

Figure 16:
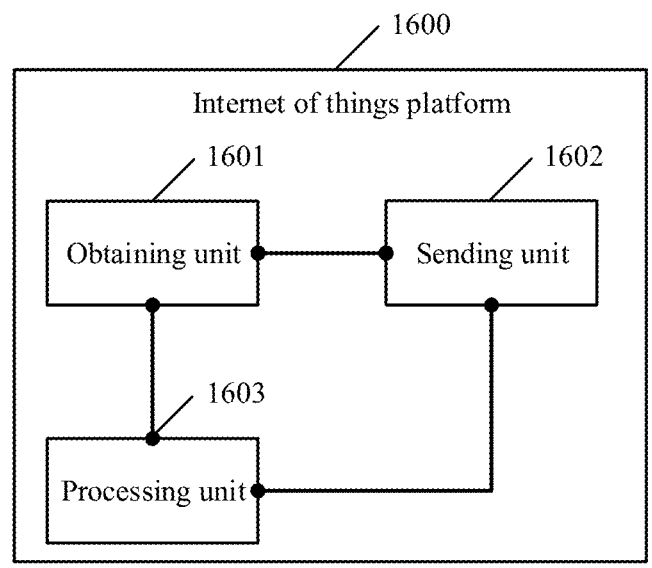
FIG. 16 is a possible schematic composition diagram of an IoT platform.

When each function module is obtained through division based on each corresponding function. FIG. 16 is a possible schematic composition diagram of the IoT platform in the foregoing embodiments. An IoT platform 1600 can perform the steps performed by the IoT platform in any one of the method embodiments of this application. The IoT platform 1600 may include an obtaining unit 1601, a sending unit 1602, and a processing unit 1603.

The obtaining unit 1601 is configured to perform or support the IoT platform in performing the method described in the embodiments of this application. For example, the obtaining unit 1601 is configured to: perform or support the IoT platform in performing step 701 and step 708 in the cross-network wake-up method shown in FIG. 7, obtain a connection request message from an IoT device, obtain a processing result from the IoT device, obtain a first registration instruction from an agent device, obtain a second registration instruction from the IoT device, and perform or support the IoT platform in performing step 1401 in the process shown in FIG. 14.

The sending unit 1602 is configured to perform or support the IoT platform in performing the method described in the embodiments of this application. For example, the sending unit 1602 is configured to: perform or support the IoT platform in performing step 702 and step 706 in the cross-network wake-up method shown in FIG. 7, send a first registration success message to the agent device, send a second registration success message to the IoT device, perform or support the IoT platform in performing step 1303 in the process shown in FIG. 13, and perform or support the IoT platform in performing step 1402 in the process shown in FIG. 14.

The processing unit 1603 is configured to perform or support the IoT platform in performing the method described in the embodiments of this application. For example, the processing unit 1603 is configured to: perform or support the IoT platform in performing step 705 in the cross-network wake-up method shown in FIG. 7, and perform or support the IoT platform in performing step 1101 and step 1102 in the process shown in FIG. 11.

Figure 17:
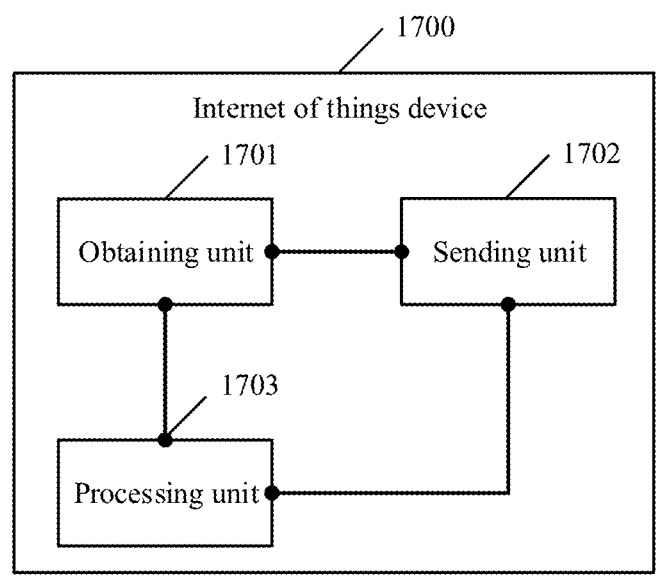
FIG. 17 is a possible schematic composition diagram of an IoT device.

When each function module is obtained through division based on each corresponding function. FIG. 17 is a possible schematic composition diagram of the IoT device in the foregoing embodiments. An IoT device 1700 can perform the steps performed by the IoT device in any one of the method embodiments of this application. The IoT device 1700 may include an obtaining unit 1701, a sending unit 1702, and a processing unit 1703.

The obtaining unit 1701 is configured to perform or support the IoT device in performing the method described in the embodiments of this application. For example, the obtaining unit 1701 is configured to: obtain a wake-up message from an agent device, obtain an operation instruction from an IoT platform, obtain a second registration success message from the IoT platform, perform or support the IoT device in performing step 1301 and step 1304 in the process in FIG. 13, and obtain a command forwarding message from the agent device.

The sending unit 1702 is configured to perform or support the IoT device in performing the method described in the embodiments of this application. For example, the sending unit 1702 is configured to: perform or support the IoT device in performing step 704 and step 707 in the cross-network wake-up method shown in FIG. 7, send a second registration instruction to the IoT platform, and perform or support the IoT device in performing step 1302 in the process in FIG. 13.

The processing unit 1703 is configured to perform or support the IoT device in performing the method described in the embodiments of this application. For example, the processing unit 1703 is configured to execute an operation instruction from the IoT platform.

It should be noted that all related content of the steps in the foregoing method embodiments may be cited in function descriptions of corresponding function modules. Details are not described herein again.

The agent device, the IoT platform, and the IoT device provided in the embodiments of this application are configured to perform the method in any one of the foregoing embodiments. Therefore, an effect the same as the effect of the methods in the foregoing embodiments can be achieved.

Figure 18:
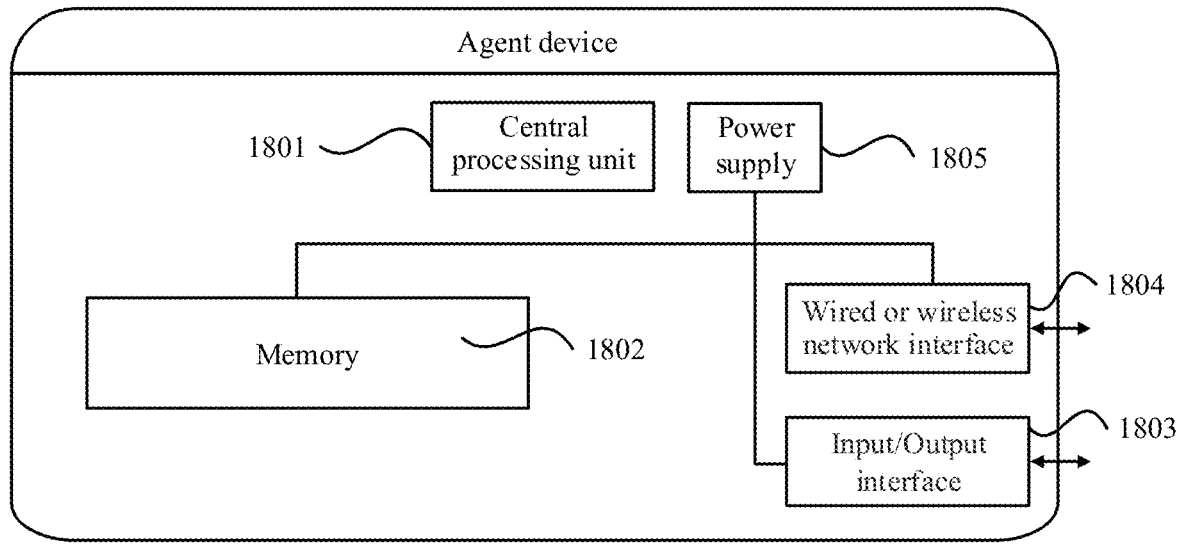
FIG. 18 is a schematic diagram of an embodiment of an agent device according to an embodiment of this application.

As shown in FIG. 18, an embodiment of the agent device in the embodiments of this application may include one or more central processing units 1801, a memory 1802, an input/output interface 1803, a wired or wireless network interface 1804, and a power supply 1805.

The memory 1802 may be a transient storage or persistent storage. Further, the central processing unit 1801 may be configured to communicate with the memory 1802, and perform, on the agent device, a series of instruction operations in the memory 1802.

In some embodiments, the central processing unit 1801 may perform operations performed by the agent device in the foregoing embodiments shown in FIG. 7 to FIG. 14. Details are not described herein again.

In some embodiments, specific function module division in the central processing unit 1801 may be similar to function module division in the units such as the obtaining unit and the sending unit described in FIG. 15. Details are not described herein again.

Figure 19:
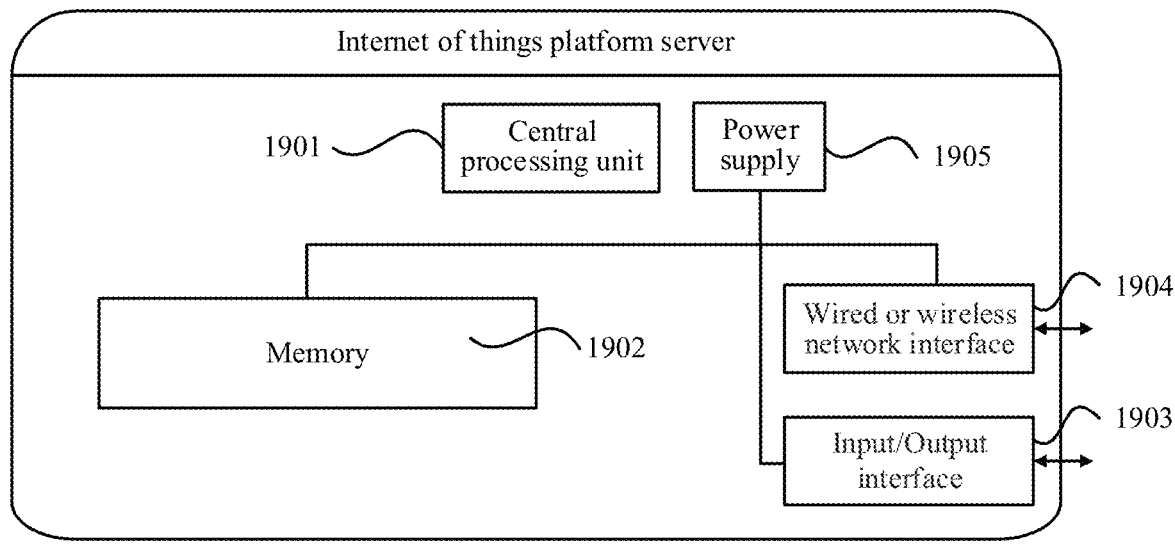
FIG. 19 is a schematic diagram of an embodiment of an IoT platform according to an embodiment of this application.

As shown in FIG. 19, an embodiment of an IoT platform server in the embodiments of this application may include one or more central processing units 1901, a memory 1902, an input/output interface 1903, a wired or wireless network interface 1904, and a power supply 1905.

The memory 1902 may be a transient storage or persistent storage. Further, the central processing unit 1901 may be configured to communicate with the memory 1902, and perform, on the IoT platform server, a series of instruction operations in the memory 1902.

In some embodiments, the one or more central processing units 1901 may perform operations performed by the IoT platform in the foregoing embodiments shown in FIG. 7 to FIG. 14. Details are not described herein again.

In some embodiments, specific function module division in the central processing unit 1901 may be similar to function module division in the units such as the obtaining unit, the sending unit, and the processing unit described in FIG. 16. Details are not described herein again.

Figure 20:
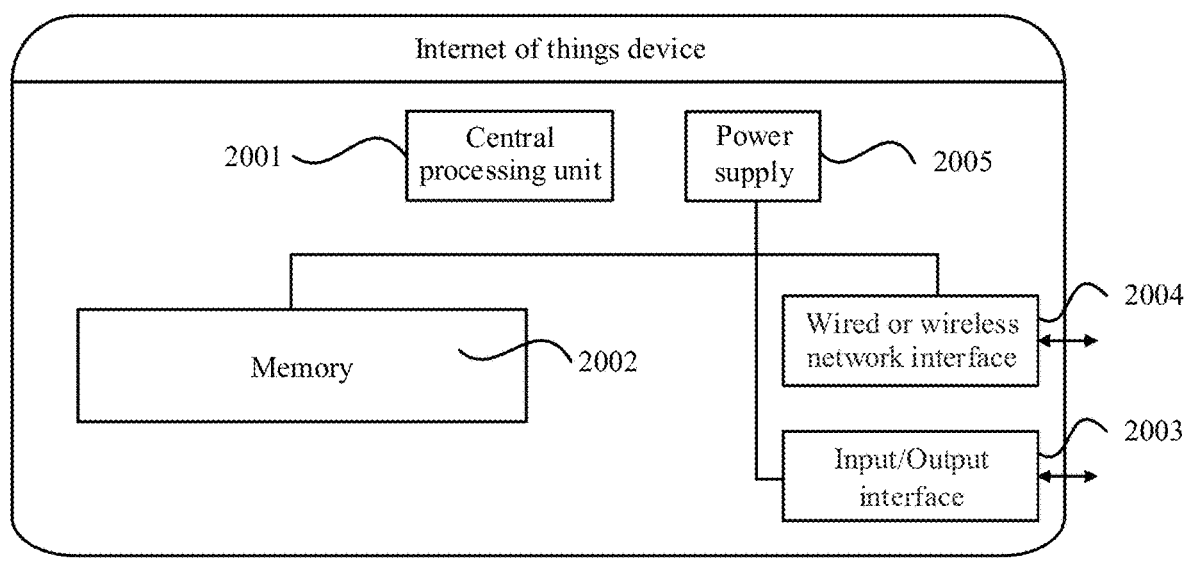
FIG. 20 is a schematic diagram of an embodiment of an IoT device according to an embodiment of this application.

As shown in FIG. 20, an embodiment of the IoT device in the embodiments of this application may include one or more central processing units 2001, a memory 2002, an input/output interface 2003, a wired or wireless network interface 2004, and a power supply 2005.

The memory 2002 may be a transient storage or persistent storage. Further, the central processing unit 2001 may be configured to communicate with the memory 2002, and perform, on the IoT device, a series of instruction operations in the memory 2002.

In some embodiments, the one or more central processing units 2001 may perform operations performed by the IoT device in the foregoing embodiments shown in FIG. 7 to FIG. 14. Details are not described herein again.

In some embodiments, specific function module division in the central processing unit 2001 may be similar to function module division in the units such as the obtaining unit, the sending unit, and the processing unit described in FIG. 17. Details are not described herein again.

These embodiments further provides a computer-readable storage medium. The computer-readable storage medium may be transitory or non-transitory and includes instructions. When the instructions are run on an agent device, an IoT platform, or an IoT device, the agent device, the IoT platform, or the IoT device is enabled to perform related method steps in FIG. 7. FIG. 11. FIG. 13, and FIG. 14, to implement the methods in the foregoing embodiments.

These embodiments further provides a computer program product including instructions. When the computer program product runs on an agent device, an IoT platform, or an IoT device, the agent device, the IoT platform, or the IoT device is enabled to perform related method steps in FIG. 7. FIG. 11. FIG. 13, and FIG. 14, to implement the methods in the foregoing embodiments.

It can be clearly understood by a person skilled in the art that, for a purpose of convenient and brief description, for detailed working processes of the foregoing system, apparatus, and unit, refer to corresponding processes in the foregoing method embodiments. Details are not described herein.

In the several embodiments provided in this application, it should be understood that the disclosed system, apparatus, and method may be implemented in another manner. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for enabling a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A cross-network wake-up method, comprising:
obtaining, by an agent device, a wake-up instruction sent by an Internet of things platform, wherein the wake-up instruction comprises a private network address of a to-be-woken-up Internet of things device; the agent device maintains, through a network address translation device, a heartbeat connection to the Internet of things platform deployed on a public network; and the agent device and N to-be-woken-up Internet of things devices are deployed on a same private network, wherein N is an integer greater than or equal to 1; and sending, by the agent device, a wake-up message to the to-be-woken-up Internet of things device based on the wake-up instruction using the private network address, wherein the wake-up message is used to indicate to the to-be-woken-up Internet of things device to send a connection request message to the Internet of things platform, and the connection request message is used to indicate to the Internet of things platform to connect to the to-be-woken-up Internet of things device.

2. The method according to claim 1, wherein the wake-up instruction further comprises an identity (ID) and a wake-up key of the to-be-woken-up Internet of things device, and
wherein the wake-up message comprises the ID and the wake-up key of the to-be-woken-up Internet of things device, and the wake-up key is used for authentication before the to-be-woken-up Internet of things device establishes a connection to the Internet of things platform.

3. The method according to claim 1, wherein the private network address of the to-be-woken-up Internet of things device is in a target private network segment stored by the agent device, and the target private network segment comprises one or more private network addresses served by the agent device.

4. The method according to claim 3, wherein before the obtaining, by the agent device, the wake-up instruction sent by the Internet of things platform, the method further comprises:
sending, by the agent device, a registration instruction to the Internet of things platform, wherein the registration instruction comprises an identifier, a registration type, and a private network address of the agent device, and the registration type is used to indicate a device type of the agent device; and
receiving, by the agent device, the target private network segment from the Internet of things platform.

5. An agent device, comprising:
a central processing unit, a memory, an input/output interface, a wired or wireless network interface, and a power supply, wherein:
the central processing unit is configured to communicate with the memory, and execute, on the agent device, an instruction operation stored in the memory, to:
maintain, through a network address translation device, a heartbeat connection to an Internet of things platform deployed on a public network, wherein the agent device and N to-be-woken-up Internet of things devices are deployed on a same private network, and N is an integer greater than or equal to 1;
obtain a wake-up instruction sent by the Internet of things platform, wherein the wake-up instruction comprises a private network address of a to-be-woken-up Internet of things device; the agent device; and
send a wake-up message to the to-be-woken-up Internet of things device based on the wake-up instruction using the private network address, wherein the wake-up message is used to indicate to the to-be-woken-up Internet of things device to send a connection request message to the Internet of things platform, and the connection request message is used to indicate to the Internet of things platform to connect to the to-be-woken-up Internet of things device.

6. The agent device according to claim 5,
wherein the wake-up message comprises an identity (ID) and a wake-up key of the to-be-woken-up Internet of things device, and the wake-up key is used for authentication before the to-be-woken-up Internet of things device establishes a connection to the Internet of things platform.

7. The agent device according to claim 5, wherein the private network address of the to-be-woken-up Internet of things device is in a target private network segment stored by the agent device, and the target private network segment comprises one or more private network addresses served by the agent device.

8. The agent device according to claim 7, wherein the central processing unit is configured to communicate with the memory, and execute, on the agent device, an instruction operation in the memory, to:
send a registration instruction to the Internet of things platform, wherein the registration instruction comprises an identifier, a registration type, and a private network address of the agent device, and the registration type is used to indicate a device type of the agent device; and
receive the target private network segment from the Internet of things platform, wherein the target private network segment comprises the one or more private network addresses served by the agent device.

9. An Internet of things platform, comprising:
a central processing unit, a memory, an input/output interface, a wired or wireless network interface, and a power supply, wherein:
the central processing unit is configured to communicate with the memory, and execute, on the Internet of things platform, an instruction operation in the memory, to:
send a wake-up instruction to an agent device, wherein the wake-up instruction comprises a private network address of a to-be-woken-up Internet of things device; the agent device maintains, through a network address translation device, a heartbeat connection to the Internet of things platform deployed on a public network; the agent device and the to-be-woken-up Internet of things device are deployed on a same private network; the wake-up instruction instructs the agent device to send a wake-up message to the to-be-woken-up device; and the wake-up message is used to indicate to the to-be-woken-up device to send a connection message to the Internet of things platform;
receive the connection request message, wherein the connection request message comprises an identifier of the to-be-woken-up device; and
connect to the to-be-woken-up device based on the connection request message.

10. The Internet of things platform according to claim 9, wherein the central processing unit is configured to communicate with the memory, and execute, on the Internet of things platform, the instruction operation in the memory, to:
receive a registration instruction of the agent device, wherein the registration instruction comprises an identifier, a registration type, and a private network address of the agent device, and the registration type is used to indicate a device type of the agent device;
determine a target private network segment of the agent device based on the private network address of the agent device, wherein the target private network segment comprises one or more private network addresses served by the agent device;
store the identifier and the registration type of the agent device; and
send the target private network segment to the agent device.

11. The Internet of things platform according to claim 9, wherein the central processing unit is configured to communicate with the memory, and execute, on the Internet of things platform, the instruction operation in the memory, to:

receive a registration instruction of the to-be-woken-up Internet of things device, wherein the registration instruction comprises an identity (ID), a registration type, the private network address, and function information of the to-be-woken-up Internet of things device, the registration type is used to indicate a device type of the to-be-woken-up Internet of things device, and the function information comprises wake-up support information; and store the ID, the registration type, the private network address, and the function information of the to-be-woken-up Internet of things device.

12. The Internet of things platform according to claim 9, wherein the central processing unit is configured to communicate with the memory, and execute, on the Internet of things platform, the instruction operation in the memory, to:

generate the wake-up instruction, wherein the wake-up instruction carries an ID and a wake-up key of the to-be-woken-up Internet of things device, and the ID and the wake-up key of the to-be-woken-up Internet of things device are used for authentication before the to-be-woken-up Internet of things device establishes a connection to the Internet of things platform.

13. The Internet of things platform according to claim 9, wherein the central processing unit is configured to communicate with the memory, and execute, on the Internet of things platform, the instruction operation in the memory, to:

determine that a device status of the to-be-woken-up Internet of things device is offline;

generate the wake-up instruction based on an ID of the to-be-woken-up Internet of things device and the private network address that is of the to-be-woken-up Internet of things device and that is stored on the Internet of things platform.

\* \* \* \* \*

UNITED STATES PATENT AND TRADEMARK OFFICE
CERTIFICATE OF CORRECTION

PATENT NO. : 12,160,825 B2
APPLICATION NO. : 17/683863
DATED : December 3, 2024
INVENTOR(S) : Hongge Guo Page 1 of 1

It is certified that error appears in the above-identified patent and that said Letters Patent is hereby corrected as shown below:

In the Claims

In Column 29, Claim 5, Line 54, delete "device; the agent device;" and insert -- device; --, therefor.

Signed and Sealed this
Fourth Day of February, 2025

Coke Morgan Stewart
*Acting Director of the United States Patent and Trademark Office*